(12) United States Patent
Tanaka et al.

(10) Patent No.: US 12,200,377 B2
(45) Date of Patent: Jan. 14, 2025

(54) IMAGING APPARATUS, IMAGING METHOD, AND IMAGING PROGRAM

(71) Applicant: FUJIFILM Corporation, Tokyo (JP)

(72) Inventors: Koichi Tanaka, Saitama (JP); Tatsuo Onodera, Saitama (JP)

(73) Assignee: FUJIFILM Corporation, Tokyo (JP)

(*) Notice: Subject to any disclaimer, the term of this patent is extended or adjusted under 35 U.S.C. 154(b) by 341 days.

(21) Appl. No.: 17/455,618

(22) Filed: Nov. 18, 2021

(65) Prior Publication Data

US 2022/0078361 A1    Mar. 10, 2022

Related U.S. Application Data

(63) Continuation of application No. PCT/JP2020/019250, filed on May 14, 2020.

(30) Foreign Application Priority Data

May 20, 2019  (JP) .................................. 2019-094859

(51) Int. Cl.
    *H04N 25/53*      (2023.01)
    *H04N 23/71*      (2023.01)
    (Continued)

(52) U.S. Cl.
    CPC ............. *H04N 25/53* (2023.01); *H04N 23/71* (2023.01); *H04N 23/73* (2023.01); *H04N 25/76* (2023.01)

(58) Field of Classification Search
    CPC ........ H04N 25/53; H04N 23/71; H04N 23/73; H04N 25/76; H04N 23/55; H04N 23/54;
    (Continued)

(56) References Cited

U.S. PATENT DOCUMENTS

| 6,148,150 A * | 11/2000 | Yajima | ................... | H04N 23/68 348/208.99 |
| 10,887,521 B2 * | 1/2021 | Kimura | ................... | H04N 23/55 |

(Continued)

FOREIGN PATENT DOCUMENTS

| JP | 2007-251382 A | 9/2007 |
| JP | 2012-129588 A | 7/2012 |

(Continued)

OTHER PUBLICATIONS

International Preliminary Report on Patentability issued in PCT/JP2020/019250; completed Dec. 28, 2020.

(Continued)

*Primary Examiner* — Shahbaz Nazrul
(74) *Attorney, Agent, or Firm* — Studebaker & Brackett PC

(57) ABSTRACT

An imaging apparatus includes an imaging element, a moving mechanism that corrects a shake, a curtain that blocks an incidence ray on the imaging element by traveling in a column direction, and a processor configured to, in a state where the moving mechanism moves the imaging element, in a case where an instruction to start imaging with an exposure time period less than or equal to a predetermined time period is received, perform a moving amount reduction control for reducing a moving amount for moving the imaging element from an elapse of a timing of reception of the instruction until a start of exposure of the imaging element, compared to a moving amount of the imaging element at the timing of reception of the instruction, in a state where the moving amount reduction control is performed, start a reset control for sequentially resetting a plurality of pixels included in the imaging element along the column direction for each line in a row direction, and after an elapse of a time period corresponding to the exposure (Continued)

time period from the start of the reset control, cause the curtain to travel in the column direction.

18 Claims, 18 Drawing Sheets

(51) Int. Cl.
*H04N 23/73* (2023.01)
*H04N 25/76* (2023.01)

(58) Field of Classification Search
CPC .. H04N 23/60; H04N 23/6812; H04N 23/687; G03B 13/36; G03B 2205/0007; G03B 17/14

See application file for complete search history.

(56) References Cited

U.S. PATENT DOCUMENTS

| | | | |
|---|---|---|---|
| 2009/0213233 A1 | 8/2009 | Kido | |
| 2012/0147201 A1* | 6/2012 | Asukabe | H04N 23/6812 348/208.1 |
| 2013/0063615 A1* | 3/2013 | Takeuchi | H04N 23/687 348/208.11 |
| 2015/0256756 A1* | 9/2015 | Sakurai | H04N 23/689 348/208.5 |
| 2017/0054921 A1* | 2/2017 | Lu | H04N 5/2621 |
| 2018/0011387 A1 | 1/2018 | Murashima et al. | |
| 2020/0021769 A1* | 1/2020 | Niwa | H04N 25/40 |
| 2022/0159163 A1* | 5/2022 | Kuwahara | H04N 23/685 |

FOREIGN PATENT DOCUMENTS

| | | |
|---|---|---|
| JP | 2015-148646 A | 8/2015 |
| WO | 2016/125587 A1 | 8/2016 |

OTHER PUBLICATIONS

International Search Report issued in PCT/JP2020/019250; mailed Jul. 14, 2020.
Written Opinion of the International Searching Authority issued in PCT/JP2020-019250; mailed Jul. 14, 2020.
Written Opinion of the International Preliminary Examining Authority issued in PCT/JP2020/019250; mailed Oct. 13, 2020.

\* cited by examiner

IMAGING APPARATUS, IMAGING METHOD, AND IMAGING PROGRAM

CROSS-REFERENCE TO RELATED APPLICATIONS

This application is a continuation application of International Application No. PCT/JP2020/019250, filed May 14, 2020, the disclosure of which is incorporated herein by reference in its entirety. Further, this application claims priority under 35 USC 119 from Japanese Patent Application No. 2019-094859 filed May 20, 2019, the disclosure of which is incorporated by reference herein.

BACKGROUND

1. Technical Field

The disclosed technology relates to an imaging apparatus, an imaging method, and an imaging program.

2. Related Art

JP2012-129588A discloses an imaging apparatus comprising an imaging element consisting of a plurality of pixels, a mechanical rear curtain that travels in order to block incidence of light on the imaging element, a reset unit that sequentially performs reset scanning on the imaging element for each line before traveling of the mechanical rear curtain, and a correction control unit that corrects a timing of the reset scanning performed by the reset unit for each line based on a moving amount of the imaging element which is moved based on a detection result of vibration.

SUMMARY

An embodiment according to the disclosed technology provides an imaging apparatus, an imaging method, and an imaging program capable of reducing an uneven exposure value in an image obtained by imaging, compared to a case where a moving amount for moving the imaging element from an elapse of a timing of reception of an instruction to start imaging until a start of exposure of the imaging element is not reduced compared to a moving amount of the imaging element at the timing of reception of the instruction to start imaging.

A first aspect according to the disclosed technology is an imaging apparatus comprising an imaging element in which a plurality of pixels are arranged in a row direction and a column direction, a correction unit that corrects a shake by moving the imaging element, a curtain that blocks an incidence ray on the imaging element by traveling in the column direction, and a control unit that, in a state where the correction unit moves the imaging element, in a case where an instruction to start imaging with an exposure time period less than or equal to a predetermined time period is received, performs a moving amount reduction control for reducing a moving amount for moving the imaging element from an elapse of a timing of reception of the instruction until a start of exposure of the imaging element, compared to a moving amount of the imaging element at the timing of reception of the instruction, in a state where the moving amount reduction control is performed, starts a reset control for sequentially resetting the plurality of pixels included in the imaging element along the column direction for each line in the row direction, and after an elapse of a time period corresponding to the exposure time period from the start of the reset control, causes the curtain to travel in the column direction.

A second aspect according to the disclosed technology is the imaging apparatus according to the first aspect, in which the moving amount reduction control is a stop control for stopping the imaging element within a target range including a target position using a moving target position of the imaging element at a predetermined first timing as the target position.

A third aspect according to the disclosed technology is the imaging apparatus according to the second aspect, in which the control unit derives a timing of the resetting along the column direction based on the target position of the imaging element and performs the resetting along the column direction at the derived timing.

A fourth aspect according to the disclosed technology is the imaging apparatus according to the third aspect, in which the control unit derives the timing of the resetting in accordance with traveling speed characteristics of the curtain.

A fifth aspect according to the disclosed technology is the imaging apparatus according to any one of the second to fourth aspects, in which the stop control is a control for stopping the imaging element within the target range while imaging for still images of a plurality of frames is performed in accordance with the instruction issued once.

A sixth aspect according to the disclosed technology is the imaging apparatus according to any one of the second to fifth aspects, in which the control unit, in a case of performing the stop control on the imaging element, performs processing of smoothing information indicating the target position of the imaging element in the stop control.

A seventh aspect according to the disclosed technology is the imaging apparatus according to the sixth aspect, in which the control unit, in a case of performing the stop control on the imaging element, performs a control for fixing an output value obtained by smoothing the information indicating the target position of the imaging element in the stop control, at a timing of a start of the stop control.

An eighth aspect according to the disclosed technology is the imaging apparatus according to any one of the first to seventh aspects, in which the control unit starts the reset control in a case where the moving amount of the imaging element is decreased to or below a predetermined value.

A ninth aspect according to the disclosed technology is the imaging apparatus according to any one of the first to eighth aspects, in which the control unit performs a control for restoring a roll rotation amount of the imaging element to an initial position, on the correction unit at a predetermined second timing.

A tenth aspect according to the disclosed technology is the imaging apparatus according to any one of the first to ninth aspects, in which the control unit, after the timing of reception of the instruction, performs a control for correcting the shake in the row direction by moving the imaging element, on the correction unit in only the row direction at an initial position of the imaging element.

An eleventh aspect according to the disclosed technology is the imaging apparatus according to any one of the first to tenth aspects, in which the control unit further performs shading correction in the column direction on an image obtained by imaging.

A twelfth aspect according to the disclosed technology is an imaging method comprising a step of, in a case where an instruction to start imaging with an exposure time period less than or equal to a predetermined time period is received during shake correction of correcting a shake by moving an imaging element in which a plurality of pixels are arranged in a row direction and a column direction, reducing a moving amount for moving the imaging element from an elapse of a timing of reception of the instruction until a start of exposure of the imaging element, compared to a moving amount of the imaging element at the timing of reception of the instruction, a step of, in a state where the step of reducing the moving amount is performed, starting a reset control for sequentially resetting the plurality of pixels included in the imaging element along the column direction for each line in the row direction, and a step of causing a curtain blocking an incidence ray on the imaging element to travel after an elapse of a time period corresponding to the exposure time period from the start of the reset control.

A thirteenth aspect according to the disclosed technology is an imaging program causing a computer to execute a procedure of, in a case where an instruction to start imaging with an exposure time period less than or equal to a predetermined time period is received during shake correction of correcting a shake by moving an imaging element in which a plurality of pixels are arranged in a row direction and a column direction, reducing a moving amount for moving the imaging element from an elapse of a timing of reception of the instruction until a start of exposure of the imaging element, compared to a moving amount of the imaging element at the timing of reception of the instruction, a procedure of, in a state where the procedure of reducing the moving amount is performed, starting a reset control for sequentially resetting the plurality of pixels included in the imaging element along the column direction for each line in the row direction, and a procedure of causing a curtain blocking an incidence ray on the imaging element to travel after an elapse of a time period corresponding to the exposure time period from the start of the reset control.

A fourteenth aspect according to the disclosed technology is an imaging apparatus comprising an imaging element in which a plurality of pixels are arranged in a row direction and a column direction, a correction unit that corrects a shake by moving the imaging element, a curtain that blocks an incidence ray on the imaging element by traveling in the column direction, and a processor configured to, in a state where the correction unit moves the imaging element, in a case where an instruction to start imaging with an exposure time period less than or equal to a predetermined time period is received, perform a moving amount reduction control for reducing a moving amount for moving the imaging element from an elapse of a timing of reception of the instruction until a start of exposure of the imaging element, compared to a moving amount of the imaging element at the timing of reception of the instruction, in a state where the moving amount reduction control is performed, start a reset control for sequentially resetting the plurality of pixels included in the imaging element along the column direction for each line in the row direction, and after an elapse of a time period corresponding to the exposure time period from the start of the reset control, cause the curtain to travel in the column direction.

BRIEF DESCRIPTION OF THE DRAWINGS

Exemplary embodiments of the technology of the disclosure will be described in detail based on the following figures, wherein.

DETAILED DESCRIPTION

Figure 1:
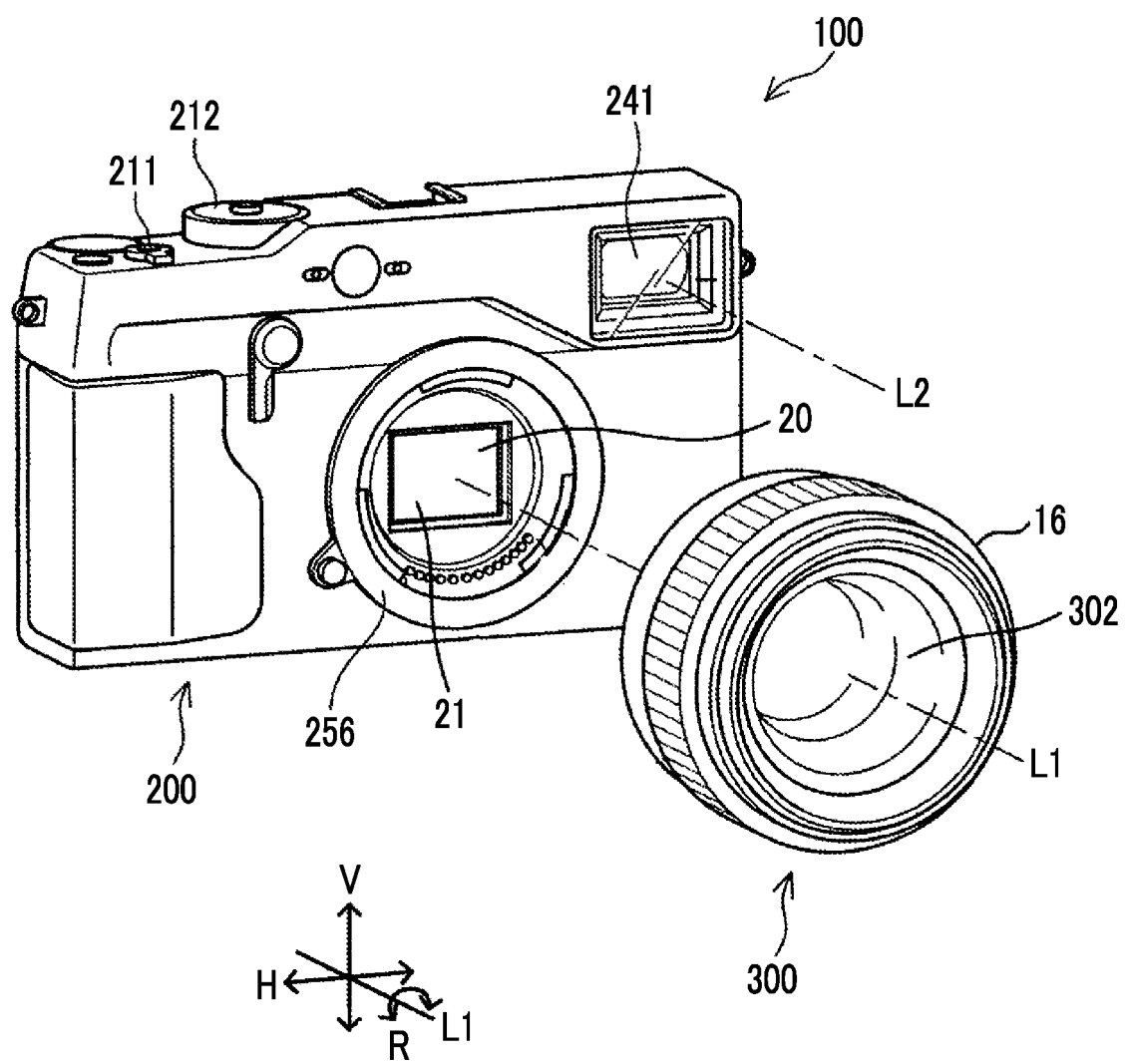
FIG. 1 is a perspective view of an imaging apparatus according to a first embodiment.

First, abbreviations used in the present specification will be described. The abbreviation "AE" stands for "Auto Exposure". The abbreviation "AF" stands for "Auto Focus". The abbreviation "MF" stands for "Manual Focus". The abbreviation "VCM" stands for "Voice Coil Motor". The abbreviation "CMOS" stands for "Complementary Metal Oxide Semiconductor". The abbreviation "CPU" stands for "Central Processing Unit". The abbreviation "I/F" stands for "InterFace". The abbreviation "TTL" stands for "Through The Lens". The abbreviation "ROM" stands for "Read Only Memory". The abbreviation "RAM" stands for "Random Access Memory". The abbreviation "LAN" stands for "Local Area Network". The abbreviation "EEPROM" stands for "Electrically Erasable Programmable Read Only Memory". The abbreviation "SSD" stands for "Solid State Drive". The abbreviation "USB" stands for "Universal Serial Bus". The abbreviation "DVD-ROM" stands for "Digital Versatile Disc Read Only Memory". The abbreviation "FPGA" stands for "Field Programmable Gate Array". The abbreviation "PLD" stands for "Programmable Logic Device". The abbreviation "ASIC" stands for "Application Specific Integrated Circuit". The abbreviation "SoC" stands for "System on Chip". The abbreviation "PID" stands for "Proportional-Integral-Differential". The abbreviation "fps" stands for "frame per second".

In the following description, a "shake" refers to a phenomenon in which in an imaging apparatus in which an image of subject light showing a subject is formed on a light-receiving surface through an optical system, a subject image obtained by forming the image of the subject light on the light-receiving surface changes because of a change in positional relationship between an optical axis of the optical system and the light-receiving surface due to a vibration exerted on the imaging apparatus.

Example of the vibration exerted on the imaging apparatus includes, in a case of an outdoor space, a vibration caused by traffic of an automobile, a vibration caused by wind, a vibration caused by construction work, and the like and, in a case of an indoor space, a vibration caused by an operation of an air conditioner, a vibration caused by entrance and exit of a person, and the like.

First Embodiment

Hereinafter, a first embodiment according to the disclosed technology will be described with reference to the drawings. In a case where concepts of upward, downward, leftward, and rightward directions are used in describing members or configurations in the drawings, the concepts simply mean, unless otherwise specified, upward, downward, leftward, and rightward directions in the drawings and do not mean absolute directions. In addition, in the following description, a meaning of "being parallel" includes a meaning of being completely parallel and also a meaning of being approximately parallel including an error allowed in design and manufacturing. Furthermore, in the following description, a meaning of "being perpendicular" includes a meaning of being completely perpendicular and also a meaning of being approximately perpendicular including an error allowed in design and manufacturing.

FIG. 1 is a perspective view illustrating an example of an exterior of an imaging apparatus 100 according to the first embodiment. The imaging apparatus 100 is a digital camera that acquires and records a still image, and includes a camera body 200 and an interchangeable lens 300 interchangeably mounted on the camera body 200.

The camera body 200 and the interchangeable lens 300 are interchangeably mounted by joining a mount 256 comprised in the camera body 200 to a mount 346 (refer to FIG. 2) corresponding to the mount 256 on the interchangeable lens 300 side.

The camera body 200 comprises an imaging element 20. The interchangeable lens 300 includes an imaging lens 16. In a case where the interchangeable lens 300 is mounted on the camera body 200, the subject light showing the subject is incident on the imaging lens 16, and the image of the subject light incident on the imaging lens 16 is formed on the imaging element 20 by the imaging lens 16.

A finder window 241 is disposed on a front surface of the camera body 200. In addition, a release button 211 and a dial 212 are disposed on an upper surface of the camera body 200. A display 34 (refer to FIG. 2) is disposed on a rear surface of the camera body 200.

In the imaging apparatus 100, an imaging mode and a playback mode are selectively set as an operation mode. The dial 212 is operated in a case of setting various modes such as the imaging mode and the playback mode. In the imaging mode, an MF mode in which the MF can be executed, and an AF mode in which the AF can be executed are selectively set in accordance with an instruction of a user. For example, switching between the MF mode and the AF mode is implemented by receiving the instruction from the user by a reception device 14 (refer to FIG. 2) including the dial 212.

The release button 211 is configured to be capable of detecting a push operation in two stages of an imaging preparation instruction state and an imaging instruction state. For example, the imaging preparation instruction state refers to a state where a push is performed to an intermediate position (half push position) from a standby position, and the imaging instruction state refers to a state where a push is performed to a final push position (full push position) exceeding the intermediate position. Hereinafter, the "state where a push is performed to the half push position from the standby position" will be referred to as a "half push state", and the "state where a push is performed to the full push position from the standby position" will be referred to as a "full push state".

In a state where the AF mode is set in the imaging apparatus 100, for example, an imaging condition is adjusted by setting the release button 211 to the half push state. Then, in a case where the full push state is subsequently set, main exposure is performed. That is, by setting the release button 211 to the half push state, an exposure value state is set by performing an AE function, and then, a focusing control is performed by performing an AF function. In a case where the release button 211 is set to the full push state, imaging is performed.

Figure 2:
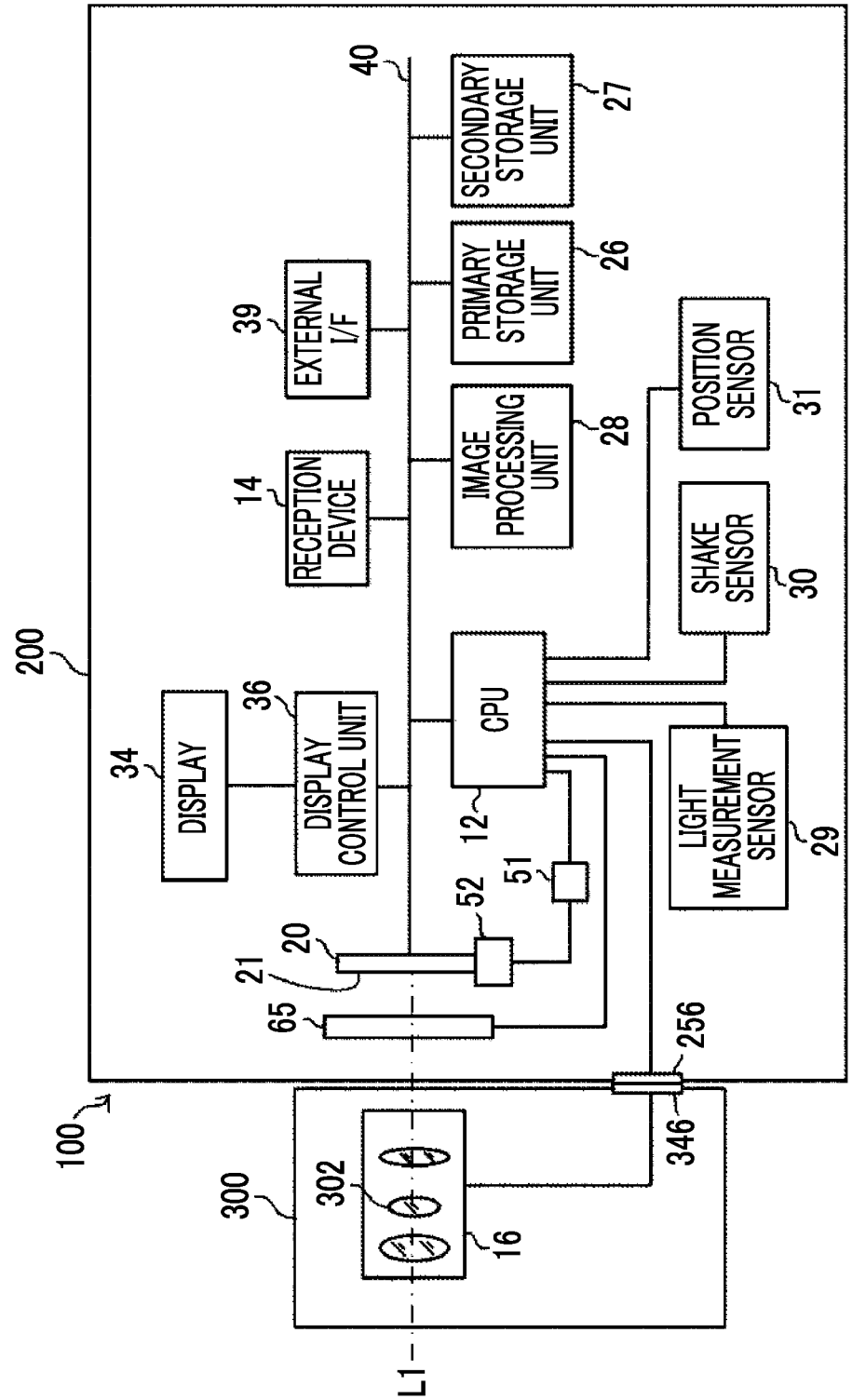
FIG. 2 is a block diagram illustrating a main configuration of an electric system of the imaging apparatus according to the first embodiment.

The imaging lens 16 comprises a focus lens 302 (refer to FIG. 2 as well). The image of the subject light is formed on a light-receiving surface 21 of the imaging element 20 by the focus lens 302, and the subject light is photoelectrically converted by the imaging element 20. Here, a CMOS image sensor is applied as an example of the imaging element 20. A signal charge obtained by photoelectric conversion is accumulated in the imaging element 20. The accumulated signal charge is read out at a predetermined frame rate (for example, 60 fps) as a digital signal corresponding to the signal charge (voltage) by a CPU 12, described later. Here, while the CMOS image sensor is illustrated as an example of the imaging element 20, the disclosed technology is not limited thereto. An image sensor of another type such as a charge coupled device (CCD) image sensor may be used as the imaging element 20.

As illustrated in FIG. 2 as an example, the imaging apparatus 100 includes the CPU 12, the reception device 14, the imaging element 20, a primary storage unit 26, a secondary storage unit 27, an image processing unit 28, a light measurement sensor 29, a shake sensor 30, a position sensor 31, the display 34, a display control unit 36, and an external I/F 39. The CPU 12, the reception device 14, the imaging element 20, the primary storage unit 26, the secondary storage unit 27, the image processing unit 28, the display control unit 36, and the external I/F 39 are connected to each other through a bus 40. The CPU 12 controls the entire imaging apparatus 100.

The CPU 12 performs a shake correction control for correcting the shake (hereinafter, simply referred to as the "shake correction control"), a moving amount reduction control for reducing a moving amount for moving the imaging element 20 from an elapse of a timing of reception of an instruction to start imaging until a start of exposure of the imaging element 20, compared to a moving amount of the imaging element 20 at the timing of reception of the instruction to start imaging (hereinafter, simply referred to as the "moving amount reduction control"), an exposure control for adjusting an exposure time period (hereinafter, simply referred to as the "exposure control"), various correction on an acquired image, and the like. The CPU 12 is an example of a "control unit (processor)" according to the embodiments of the disclosed technology.

The reception device 14 includes the release button 211 and the dial 212 and receives the instruction for the imaging apparatus 100 from the user. The display 34 is connected to the display control unit 36. The display 34 displays an image obtained by imaging by the imaging element 20 (hereinafter, simply referred to as the "image").

The primary storage unit 26 is a volatile memory used as a work area or the like in a case of executing various programs. Example of the primary storage unit 26 includes a RAM.

The secondary storage unit 27 stores the various programs. The secondary storage unit 27 is a non-volatile memory. Example of the secondary storage unit 27 includes an EEPROM or a flash memory.

The image processing unit 28 performs shading correction on the image. In addition, the image processing unit 28 performs various image processing such as white balance adjustment and gamma correction on the image. By performing the image processing by the image processing unit 28, a live view image, a still image for recording, a motion picture image for recording, and the like are selectively generated. The image on which the image processing is performed by the image processing unit 28 is acquired by the CPU 12.

The CPU 12 outputs the image such as the live view image to the display control unit 36. The display control unit 36 displays the image input from the CPU 12 on the display 34.

The external I/F 39 is connected to a communication network such as a LAN and/or the Internet and transmits and receives various information between the CPU 12 and an external apparatus such as a server, a personal computer, and/or a printer through the communication network.

The light measurement sensor 29 is a sensor of a TTL type. The disclosed technology is not limited thereto, and the imaging element 20 may be used as the light measurement sensor 29. The shake sensor 30 detects the shake of the imaging apparatus 100. Example of the shake sensor 30 includes a gyro sensor. The shake sensor 30 is not limited to the gyro sensor and may be an acceleration sensor or the like. Example of the position sensor 31 includes a device formed with a hall element.

The imaging element 20 has an electronic shutter function, and exposure is started by starting resetting of the imaging element 20 using an electronic shutter. In the first embodiment, a CMOS sensor in which a plurality of pixels, that is, photoelectric conversion elements, are two-dimensionally arranged in a row direction and a column direction is employed as an example of the imaging element 20.

Figure 3:
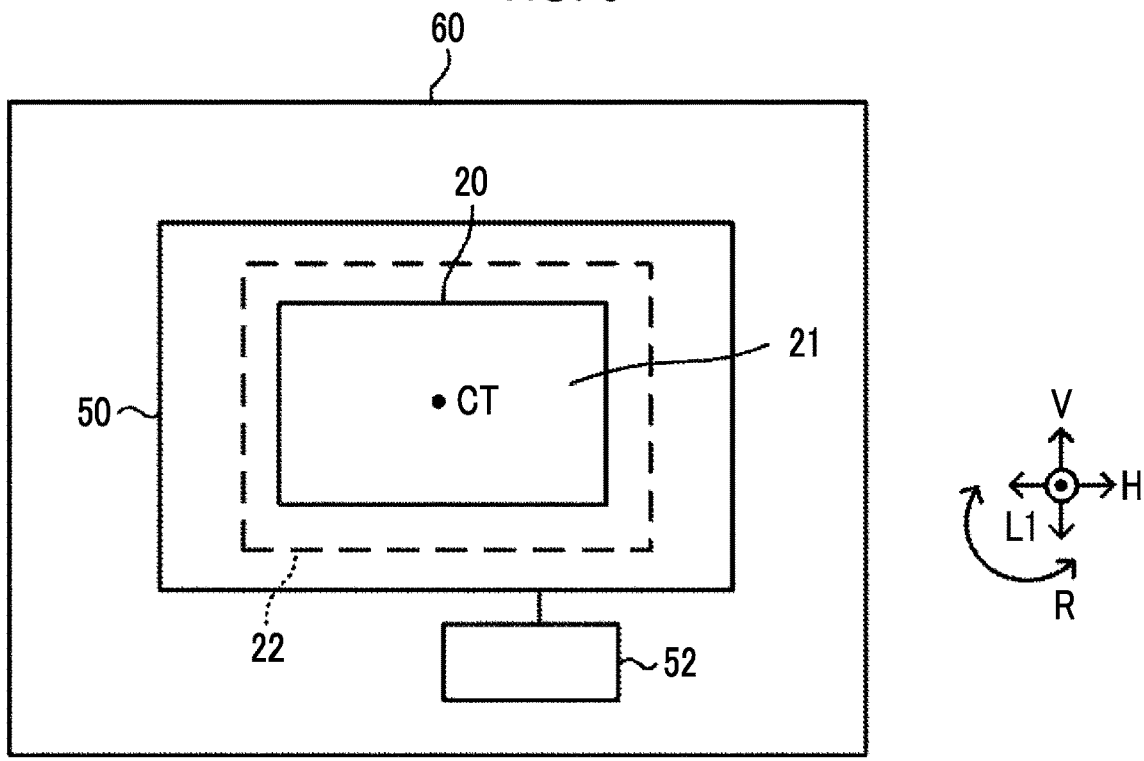
FIG. 3 is a schematic diagram illustrating a correction unit of the imaging apparatus according to the first embodiment and a moving direction of an imaging element.

As illustrated in FIG. 3 as an example, the camera body 200 comprises a moving frame 50, a support unit 60, and a plurality of voice coil motors 52. Hereinafter, the "voice coil motor" will be referred to as the "VCM". The imaging element 20 is fixed to the moving frame 50. The moving frame 50 is movably supported by the support unit 60. The support unit 60 is fixed to the camera body 200. As an example, the VCMs 52 are configured to include a permanent magnet fixed to the moving frame 50 and a coil fixed to the support unit 60.

The imaging apparatus 100 has a function (hereinafter, referred to as a "shake correction function") of correcting the shake. As illustrated in FIG. 2, the imaging apparatus 100 comprises a motor driver 51. The shake correction function is a function implemented by the CPU 12, the motor driver 51, the VCMs 52, and the like. The motor driver 51 is connected to the CPU 12 and the VCMs 52. The motor driver 51 drives the VCMs 52 under control of the CPU 12. The CPU 12 moves the imaging element 20 fixed to the moving frame 50 by providing motive power generated by driving the VCMs 52 to the moving frame 50. The imaging apparatus 100 has a movable range 22. The movable range 22 is a range in which the imaging element 20 can move. For example, the movable range 22 is a rectangular range that is wider than an outer frame of the imaging element 20 in a plan view in a plane parallel to the light-receiving surface 21. The VCMs 52 are an example of a "correction unit (moving mechanism)" according to the embodiments of the disclosed technology. The correction unit that moves the imaging element 20 is not limited to the voice coil motors. For example, a stepping motor or a piezo actuator may be used.

The imaging element 20 corrects the shake by moving in a plane parallel to the light-receiving surface 21, in other words, a plane perpendicular to an optical axis of the imaging lens 16. In a case where the shake correction function is not performed, the imaging element 20 is arranged at an initial position as illustrated in FIG. 3. The initial position refers to a position of the imaging element 20 in a case where the shake correction function is not performed. For example, the position of the imaging element 20 in a case where the shake correction function is not performed refers to a position at which an optical axis L1 of the interchangeable lens 300 passes through a center CT of the imaging element 20.

The imaging element 20 is moved by the plurality of VCMs 52 in a direction H, a direction V, and a rotation direction R illustrated in FIG. 3. The direction H refers to a direction corresponding to the row direction of the pixels of the imaging element 20 at the initial position. The direction V refers to a direction corresponding to the column direction of the pixels of the imaging element 20 at the initial position. The rotation direction R refers to a rotation direction about the optical axis L1 as a rotation axis. In the present specification, directions of the direction H, the direction V, and the rotation direction R include both directions.

In the present specification, moving the imaging element 20 in the direction H in order to correct the shake in the direction H will be referred to as a "horizontal shift". In addition, moving the imaging element 20 in the direction V in order to correct the shake in the direction V will be referred to as a "vertical shift". In addition, moving the imaging element 20 in the rotation direction R in order to correct the shake in the rotation direction R will be referred to as "roll rotation". In addition, the position of the imaging element 20 in the direction H will be referred to as a "horizontal position". In addition, the position in the direction V will be referred to as a "vertical position". Furthermore, a rotation amount in the rotation direction R will be referred to as a "roll rotation amount".

Figure 4:
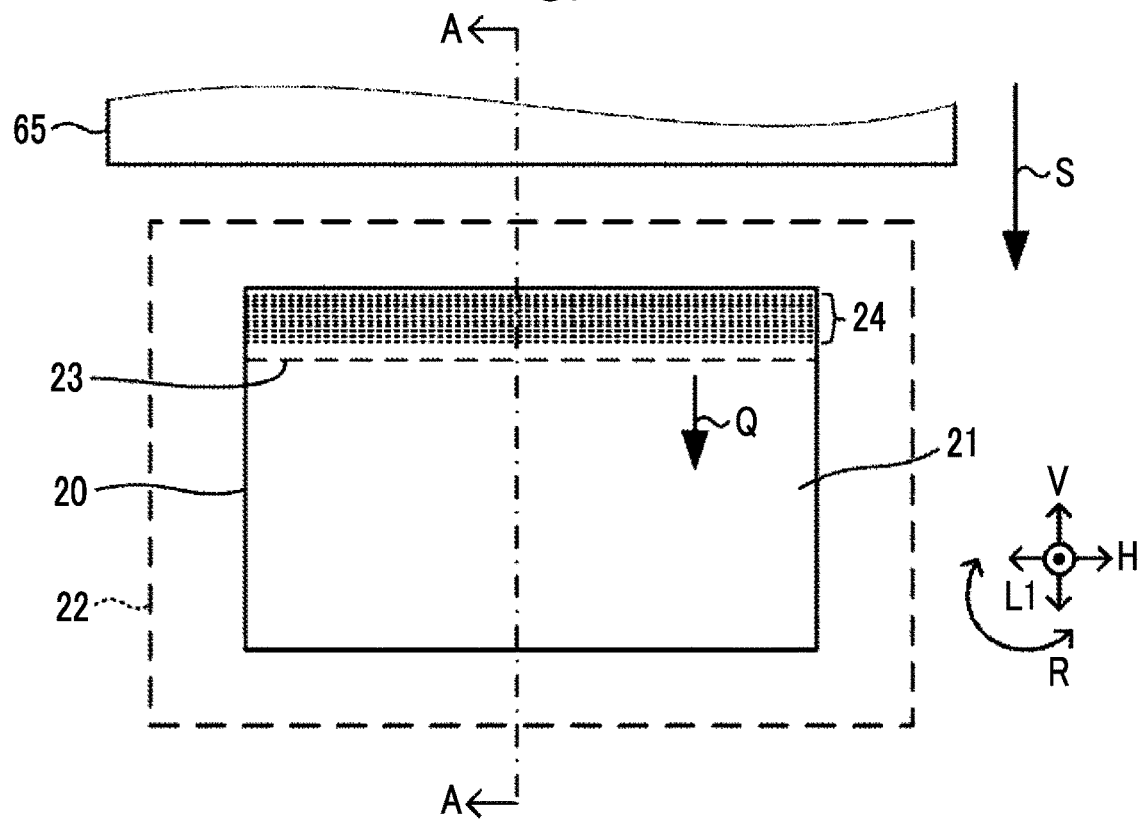
FIG. 4 is a schematic diagram for describing a position of the imaging element at an initial position and a front curtain and a rear curtain of the imaging element.

As illustrated in FIG. 4 as an example, at the initial position, the imaging element 20 is arranged at a center of the movable range 22. The imaging element 20 includes the plurality of pixels, and the plurality of pixels are arranged in the row direction and the column direction at the initial position. Here, the "pixels" refer to photoelectric conversion elements. In the imaging element 20, all of the pixels in one row direction will be referred to as a pixel line 24. In the imaging element 20, a plurality of the pixel lines 24 are arranged in the column direction.

The imaging apparatus 100 performs the exposure using a focal-plane shutter system that uses an electronic shutter functioning as a front curtain and uses a mechanical curtain as a rear curtain. As illustrated in FIG. 4 as an example, in a case of imaging the subject, the pixel lines 24 of the imaging element 20 are sequentially reset from a first row to a last row along the column direction. In the example illustrated in FIG. 4, the pixel line 24 of a target in which the resetting is currently started among the plurality of pixel lines 24 is illustrated as a reset line 23. The resetting of the pixels means discharging charges that are accumulated in the pixels by light. By starting the resetting, the exposure is started. In the imaging apparatus 100, a reset control is performed by the CPU 12 in a state where the moving amount reduction control described later is performed. The reset control refers to a control for sequentially resetting the plurality of pixels included in the imaging element 20 from the first row along the column direction, that is, a direction Q, for each line in the row direction. In FIG. 4, only a part of the pixel lines 24 is illustrated.

In addition, the imaging apparatus 100 includes a rear curtain 65. The rear curtain 65 is an example of a "curtain" according to the embodiments of the disclosed technology. The rear curtain 65 is a mechanical curtain and is arranged closer to the subject side than the light-receiving surface 21. The rear curtain 65 blocks an incidence ray on the light-receiving surface 21 by traveling in a direction of arrow S, that is, the column direction, from an upper part of the drawing by receiving biasing force by a spring or the like. The rear curtain 65 is fixed to the camera body 200 independently of the moving frame 50 to which the imaging element 20 is fixed. Thus, the rear curtain 65 does not move in connection with movement of the imaging element 20. Thus, the rear curtain 65 travels within a range that covers the movable range 22 of the imaging element 20. The rear curtain 65 is controlled to travel in the direction V after an elapse of a time period corresponding to the exposure time period from a start of the reset control. That is, a difference between a timing of the resetting and a timing of traveling of the rear curtain 65 is the exposure time period. The timing of the resetting is a timing at which each pixel line 24 is reset. The timing of traveling of the rear curtain 65 is a timing at which the rear curtain 65 passes through a position of the reset pixel line 24.

Figure 5A:
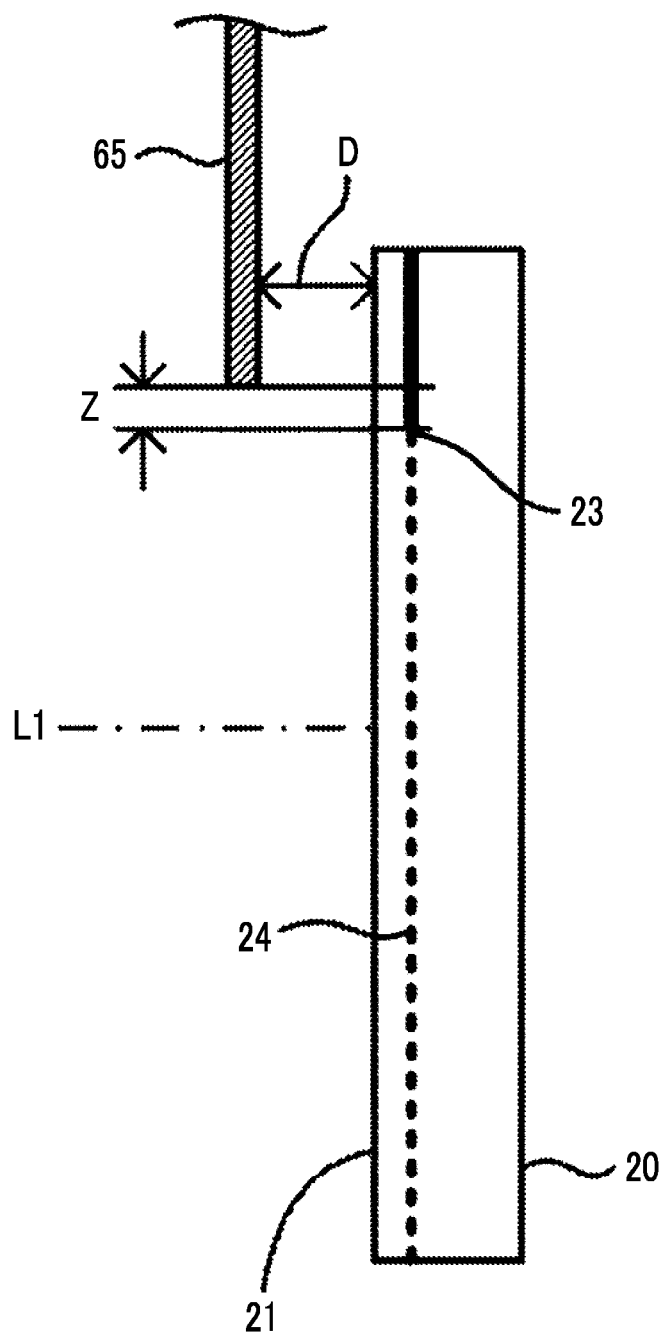
FIG. 5A is A-A cross-sectional view of FIG. 4 and is a diagram for describing a positional relationship between a reset line and the rear curtain of the imaging element.
Figure 5B:
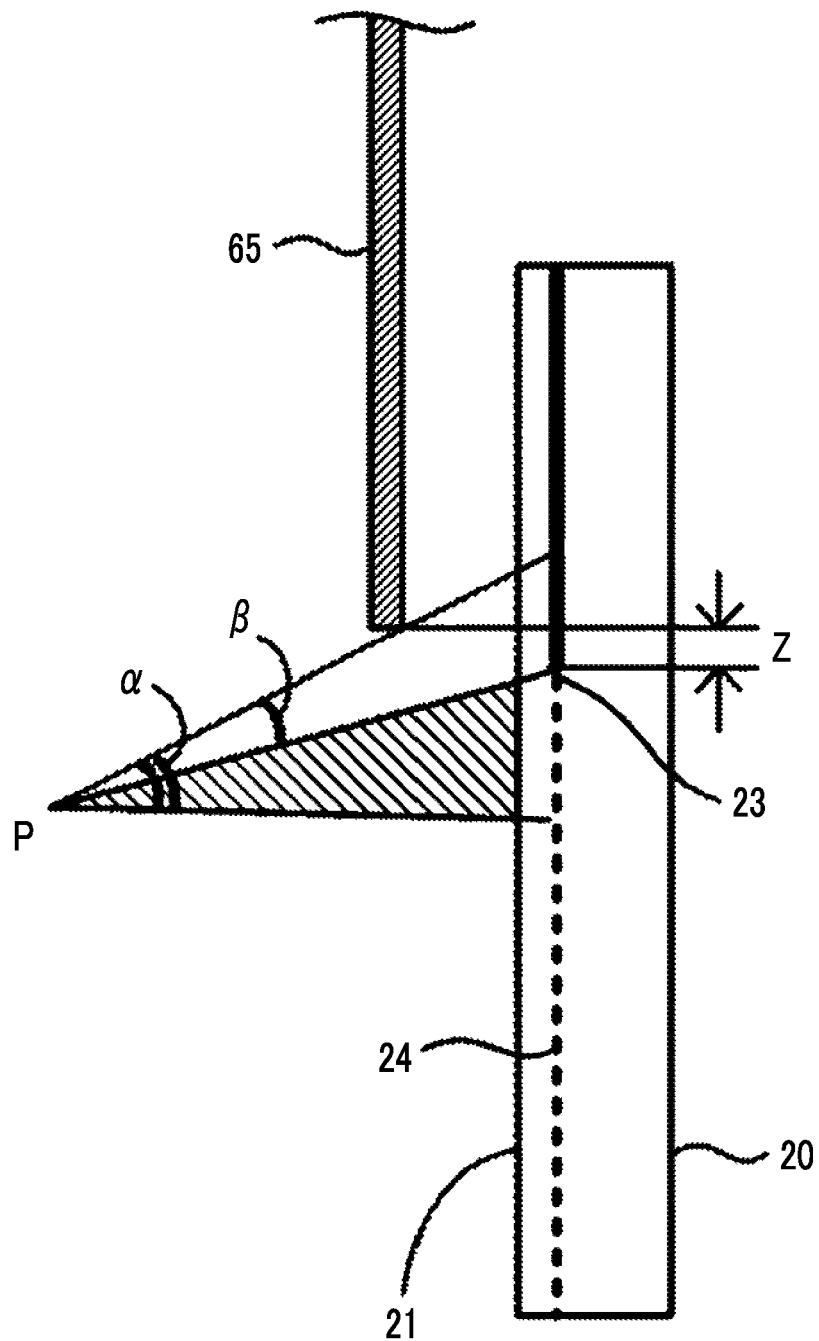
FIG. 5B is A-A cross-sectional view of FIG. 4 and is a diagram for describing a received light amount in the middle of exposure.
Figure 5C:
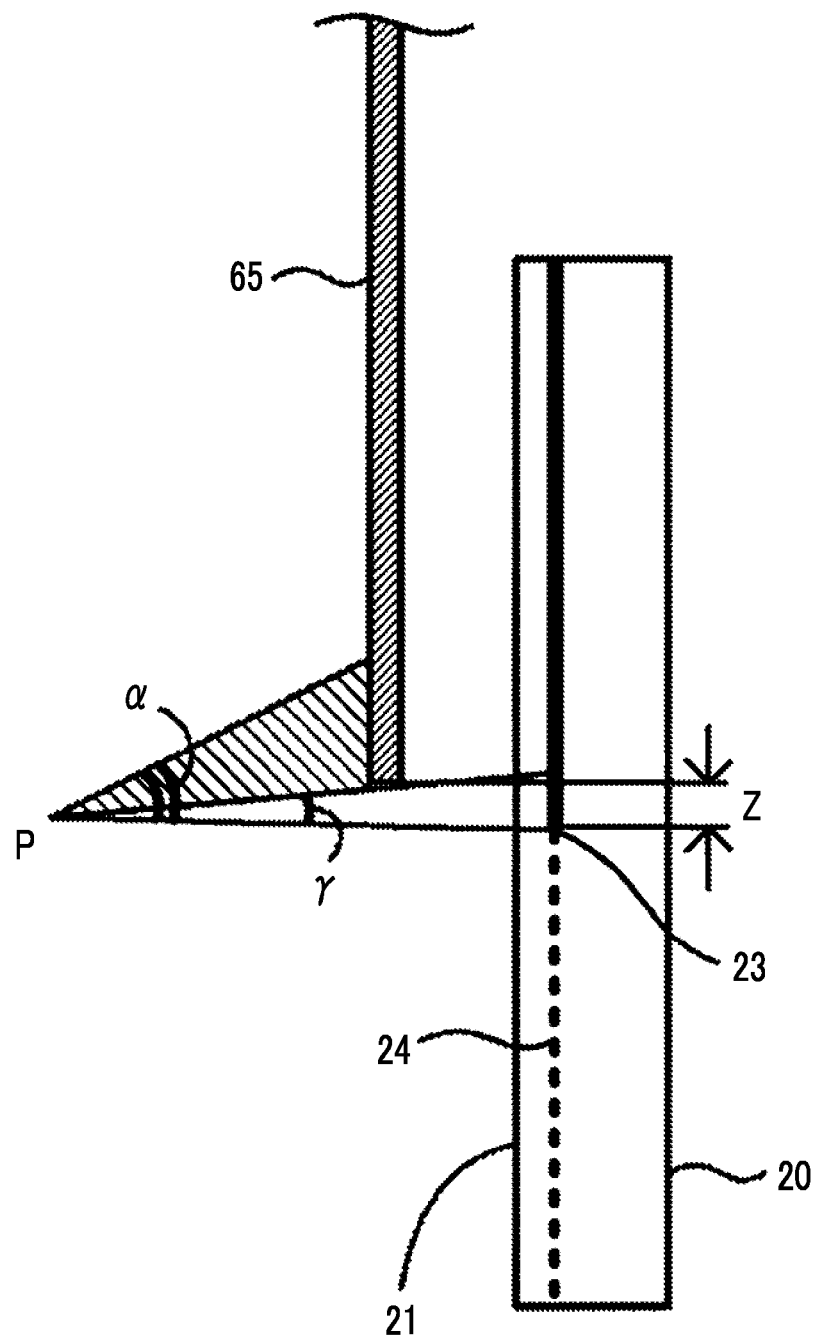
FIG. 5C is A-A cross-sectional view of FIG. 4 and is a diagram for describing the received light amount in a stage in which the exposure has further proceeded from FIG. 5B.

As illustrated in FIG. 5A as an example, the light-receiving surface 21 and the rear curtain 65 are separated by a distance D. In a case where an imaging instruction is received from the user, the imaging apparatus 100 starts resetting from the pixel line 24 of a first column Next, the rear curtain 65 starts traveling after an elapse of the exposure time period. In FIG. 5A to FIG. 5C, the pixel line 24 that is reset is illustrated by thick solid line, and the pixel line 24 that is not reset is illustrated by dotted line. As illustrated in FIG. 5A as an example, an interval Z between the reset line 23 and a lower end of the rear curtain 65 is a distance in which the rear curtain 65 travels during the exposure time period. The interval Z corresponds to a slit width that is a gap occurring between the front curtain and the rear curtain in a case where both of the front curtain and the rear curtain are mechanical curtains.

As illustrated in FIG. 5B as an example, in a case where the reset line 23 and the lower end of the rear curtain 65 reach near a center of the imaging element 20, the subject light within a range of an angle β out of the subject light within a range of an angle α passing through a point P reaches the reset pixel line 24, and the reset pixel line 24 is exposed. However, as illustrated in FIG. 5C as an example, in a case where the reset line 23 and the lower end of the rear curtain 65 further proceed in the column direction, the subject light of a part of the subject light within the angle α passing through the point P is shaded by the rear curtain 65. A range of an angle γ (<angle β) reaches the reset pixel line 24, and the reset pixel line 24 is exposed. In such a manner, in a case where the light-receiving surface 21 and the rear curtain 65 are spaced, an exposure amount at a point in time illustrated in FIG. 5B as an example is greater than the exposure amount at a point in time illustrated in FIG. 5C as an example, even in a case where the resetting of the pixel lines 24 and traveling of the rear curtain 65 are controlled such that the interval between the reset line 23 and the lower end of the rear curtain 65 correspond to a constant exposure time period. Thus, an uneven exposure value occurs in one image obtained by imaging the subject. Here, the "exposure value" is brightness in the image depending on the exposure time period. In addition, for example, the "uneven exposure value" means that the exposure value varies for each section in the image.

As a method of resolving a problem that the exposure amount changes in accordance with a position of the rear curtain 65, a method of changing a position of the reset line 23 depending on the position of the rear curtain 65 is considered. Specifically, in a case where the rear curtain 65 is in an upper portion of the imaging element 20, a reset speed of the reset line 23 is decreased. By decreasing the reset speed, the interval Z is decreased. In addition, in a case where the rear curtain 65 is in a lower portion of the imaging element 20, the reset speed of the reset line 23 is increased. By increasing the reset speed, the interval Z is increased. By controlling in such a manner, a change in received light amount is reduced regardless of the position of the rear curtain 65, and the uneven exposure value can be reduced. This will be referred to as correction of the uneven exposure value.

Meanwhile, performing the shake correction function changes the position of the imaging element 20. In a case where the imaging element 20 moves in the direction H, a vertical position of the reset line 23 with respect to the rear curtain 65 does not change. Thus, correction of the uneven exposure value is not affected. However, in a case where the imaging element 20 moves in the direction V, the vertical position of the reset line 23 with respect to the rear curtain 65 changes, and the exposure amount changes. Thus, correction of the uneven exposure value is not performed as designed, and the uneven exposure value occurs. Correction of the uneven exposure value is performed on an assumption that the imaging element 20 is at a predetermined position, for example, the initial position.

Figure 6:
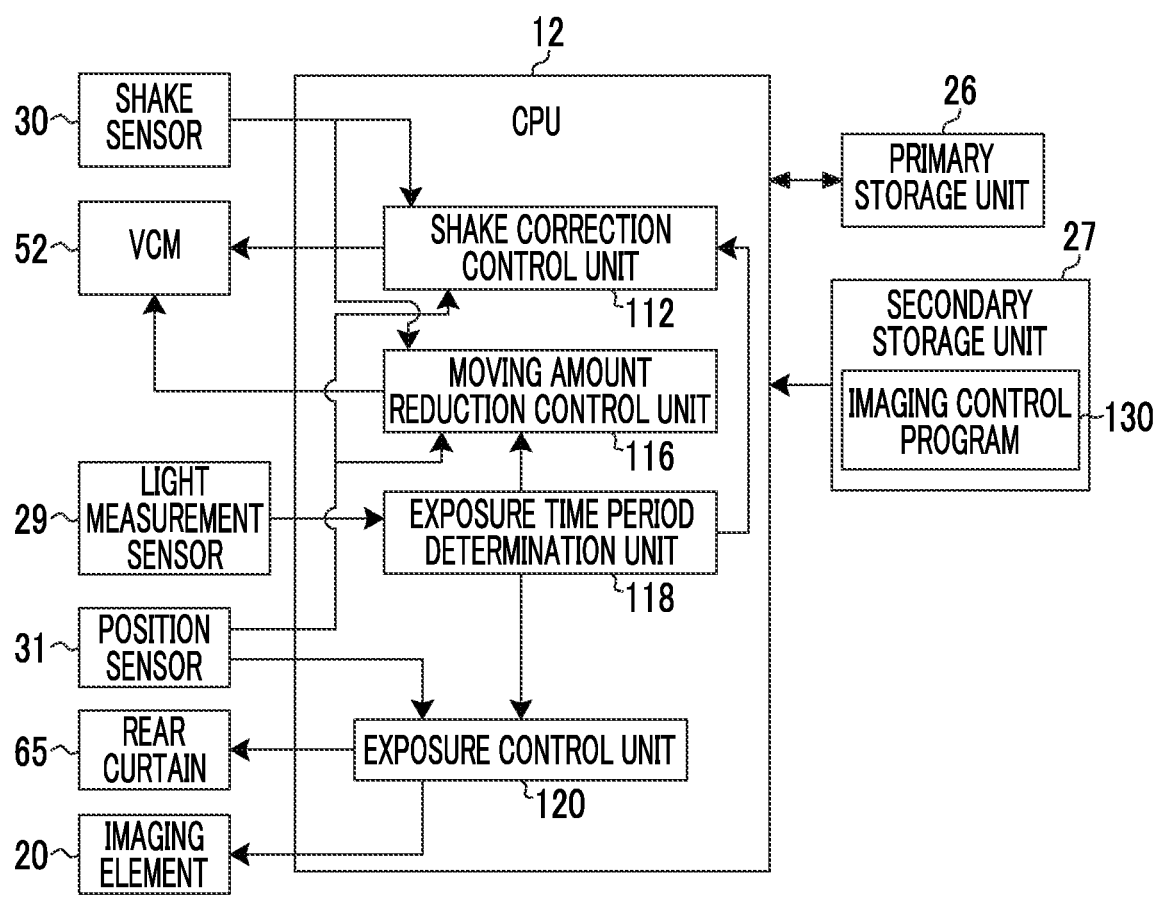
FIG. 6 is a function block diagram of a CPU of the imaging apparatus according to the first embodiment.

Therefore, as illustrated in FIG. 6 as an example, in the imaging apparatus 100, the secondary storage unit 27 stores an imaging control program 130. The CPU 12 reads out the imaging control program 130 from the secondary storage unit 27, loads the read imaging control program 130 into the primary storage unit 26, executes imaging control processing (refer to FIG. 8) in accordance with the loaded imaging control program 130. The imaging control processing (refer to FIG. 8) is implemented by causing the CPU 12 to operate as a shake correction control unit 112, a moving amount reduction control unit 116, an exposure time period determination unit 118, and an exposure control unit 120 in accordance with the imaging control program 130.

The shake correction control unit 112 controls the VCMs 52 based on a signal received from the shake sensor 30. The VCMs 52 correct the shake by moving the imaging element 20 in accordance with an instruction of the shake correction control unit 112. In a case where an instruction to pause the shake correction control is received from the exposure time period determination unit 118, the shake correction control unit 112 pauses the shake correction control.

In a state where the VCMs 52 move the imaging element 20, in a case where the instruction to start imaging with the exposure time period less than or equal to a predetermined time period is received from the user, the moving amount reduction control unit 116 performs a control for reducing the moving amount for moving the imaging element 20 from the elapse of the timing of reception of the instruction until the start of the exposure of the imaging element 20, compared to the moving amount of the imaging element 20 at the timing of reception of the instruction. This control will be referred to as the "moving amount reduction control".

For example, the "predetermined time period" of the exposure time period is predetermined by performing a sensory test as to whether or not the shake remaining in the image acquired after changing the exposure time period can be allowed in a case where the shake correction control is not performed. The predetermined exposure time period is stored in the secondary storage unit 27. Alternatively, the imaging apparatus 100 may be configured to enable the user to set the exposure time period as a reference for starting the moving amount reduction control.

In a case where an instruction to start the moving amount reduction control is received from the exposure time period determination unit 118, the moving amount reduction control unit 116 starts the moving amount reduction control.

In the present specification, the "moving amount reduction control" includes a stop control. The "stop control" is a control for stopping the imaging element 20 within a target range including a target position using a moving target position of the imaging element 20 at a predetermined timing as the target position. The "target range" refers to a range that can suppress the uneven exposure value and includes a positioning error in a control for moving the imaging element 20 to the target position. For example, the "predetermined timing" refers to a timing at which the moving amount reduction control unit 116 receives the instruction to start the moving amount reduction control from the exposure time period determination unit 118. The "predetermined timing" is not limited thereto and may be a timing at which the moving amount reduction control unit 116 starts the moving amount reduction control, a timing at which the reception device 14 receives the instruction to start imaging from the user, or the like. Here, the "predetermined timing" is an example of a "predetermined first timing" according to the embodiments of the disclosed technology. Hereinafter, the "moving target position at the predetermined timing" of the imaging element 20 will be referred to as a "specific timing position". That is, the specific timing position is the target position for stopping the imaging element 20. In the first embodiment, the moving amount reduction control unit 116 performs a control for stopping the imaging element 20 within the target range including the target position using the position of the imaging element 20 in at least the column direction as the target position.

In a case where the instruction to start imaging is received from the user, the exposure time period determination unit 118 derives the exposure time period required for imaging at the timing of reception of the instruction based on a signal received from the light measurement sensor 29. The exposure time period determination unit 118 notifies the exposure control unit 120 of the derived exposure time period. In addition, the exposure time period determination unit 118 determines whether or not the derived exposure time period is less than or equal to the predetermined time period. In a case where it is determined that the derived exposure time period is less than or equal to the predetermined time period, the exposure time period determination unit 118 instructs the shake correction control unit 112 to pause the shake correction control. In addition, in a case where it is determined that the derived exposure time period is greater than the predetermined time period, the exposure time period determination unit 118 instructs the moving amount reduction control unit 116 to start the moving amount reduction control.

The exposure control unit 120 derives the timing of the resetting of the imaging element 20 and the timing of the start of traveling of the rear curtain 65 based on information about the specific timing position and the exposure time period notified from the exposure time period determination unit 118. In a case where a condition under which the exposure is started is satisfied, the exposure control is performed at the derived timing of the resetting and the timing of the start of traveling of the rear curtain 65. For example, the condition under which the exposure is started is a case where the moving amount of the imaging element 20 is decreased to or below a predetermined value.

Figure 7:
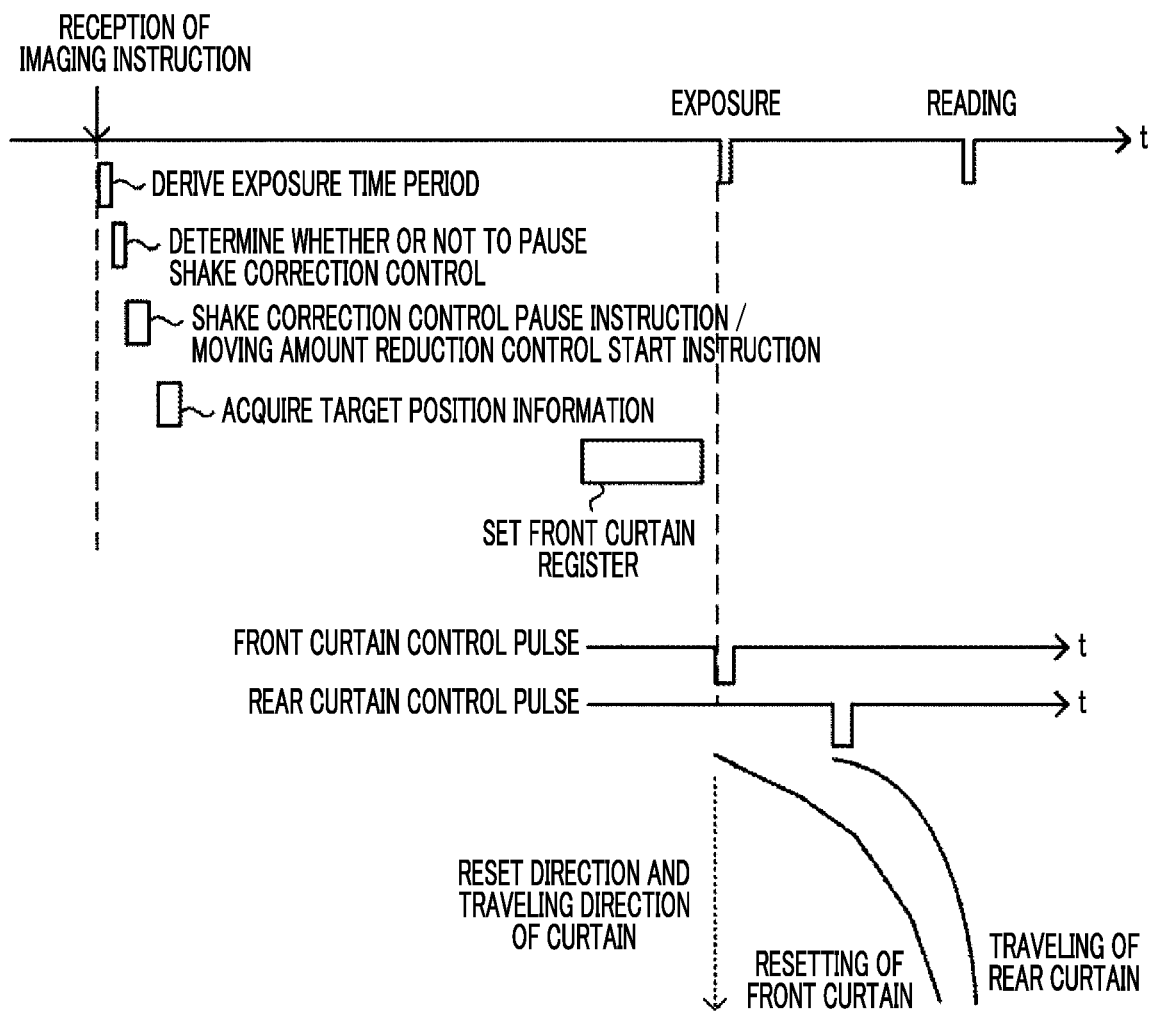
FIG. 7 is a descriptive diagram illustrating imaging control processing of the imaging apparatus according to the first embodiment in time series.

Next, a flow of the series of imaging control processing performed by the shake correction control unit 112, the moving amount reduction control unit 116, the exposure time period determination unit 118, and the exposure control unit 120 will be described in time series. Here, it will be assumed that the shake correction control is started by the shake correction control unit 112 in a stage in which the imaging apparatus 100 is powered ON. As illustrated in FIG. 7 as an example, the exposure time period determination unit 118 derives the exposure time period. Specifically, in a case where the instruction to start imaging is received from the user, the exposure time period determination unit 118 derives the exposure time period at the timing of reception of the instruction to start imaging. For example, the instruction to start imaging refers to a full push on the release button by the user.

Next, the exposure time period determination unit 118 performs a shake correction control pause determination. Specifically, the exposure time period determination unit 118 determines whether or not to pause the shake correction control based on the derived exposure time period. In a case where it is determined that the exposure time period is less than or equal to the predetermined time period, the exposure time period determination unit 118 outputs a shake correction control pause instruction to the shake correction control unit 112 and outputs a moving amount reduction control start instruction to the moving amount reduction control unit 116.

Next, the moving amount reduction control unit 116 acquires target position information about the imaging element 20. Specifically, based on information from the shake sensor 30, the moving amount reduction control unit 116 acquires target position information for stopping the imaging element 20 and starts the moving amount reduction control.

Next, the exposure control unit 120 sets a front curtain register for the reset control. Specifically, the exposure control unit 120 acquires the target position information about the imaging element 20. The exposure control unit 120 derives the timing of the resetting along the column direction of each pixel line based on the target position information in the direction V in the acquired target position information. The exposure control unit 120 stores the derived timing of the resetting in the front curtain register of the primary storage unit 26 as timing data.

A method of deriving the timing of the resetting along the column direction of each pixel line will be specifically described. A degree of change in received light amount on the light-receiving surface 21 (hereinafter, simply referred to as the "received light amount") depending on the position of the rear curtain 65 is predetermined by calculation corresponding to an incidence angle of a luminous flux and the position of the imaging element 20 in the direction V. As described using FIG. 5A to FIG. 5C, as a height of the position of the imaging element 20 in the direction V is increased, the degree of change in received light amount is increased. Therefore, based on the position of the imaging element 20 in the direction V, the exposure control unit 120 derives the timing of the resetting for changing a size of the slit such that the degree of change in received light amount is reduced.

Alternatively, the timing of the resetting along the column direction of each pixel line may be stored in the secondary storage unit 27 as a timing table including the position of the imaging element 20 in the direction V as a parameter. In this case, the exposure control unit 120 reads out the timing of the resetting corresponding to the acquired position of the imaging element 20 in the direction V from the timing table and performs the reset control.

Next, the exposure control unit 120 starts resetting the imaging element 20 by generating a front curtain control pulse. Each pixel line is reset along the column direction in accordance with the timing data stored in the front curtain register. The start of the resetting of the imaging element 20 is the start of the exposure.

Next, after the time period corresponding to the exposure time period elapses, the exposure control unit 120 causes the rear curtain 65 to travel by generating a rear curtain control pulse. In FIG. 7, a reset direction of the front curtain and a traveling direction of the rear curtain 65 are illustrated as a direction of dotted line illustrated in the drawing. In the example illustrated in FIG. 7, the reset speed of the front curtain and a traveling speed of the rear curtain 65 are gradually increased. For the rear curtain 65 that receives the biasing force by the spring or the like, characteristics of a change in traveling speed depending on the position, that is, traveling speed characteristics, are decided. Thus, the exposure control unit 120 derives the timing of the resetting in accordance with the traveling speed characteristics of the rear curtain 65 and performs the resetting at the derived timing of the resetting.

Next, after the start of the resetting of the front curtain, that is, after the predetermined time period elapses from the start of the exposure, the CPU 12 reads out digital signals of the exposed pixels and stores the read digital signals in the primary storage unit 26. Reading does not need to wait until the exposure of all pixels is finished, and the pixels of which the exposure is finished may be sequentially read out.

In FIG. 7, while a waiting time period is present from acquisition of information related to the target position for stopping the imaging element 20 until setting of the front curtain register, this waiting time period is a time period until the condition under which the exposure is started is satisfied. During the waiting time period until the start of the exposure, a live preview image is continuously displayed on the display 34.

Next, an action of the imaging apparatus 100 will be described with reference to FIG. 8 to FIG. 15.

Figure 8:
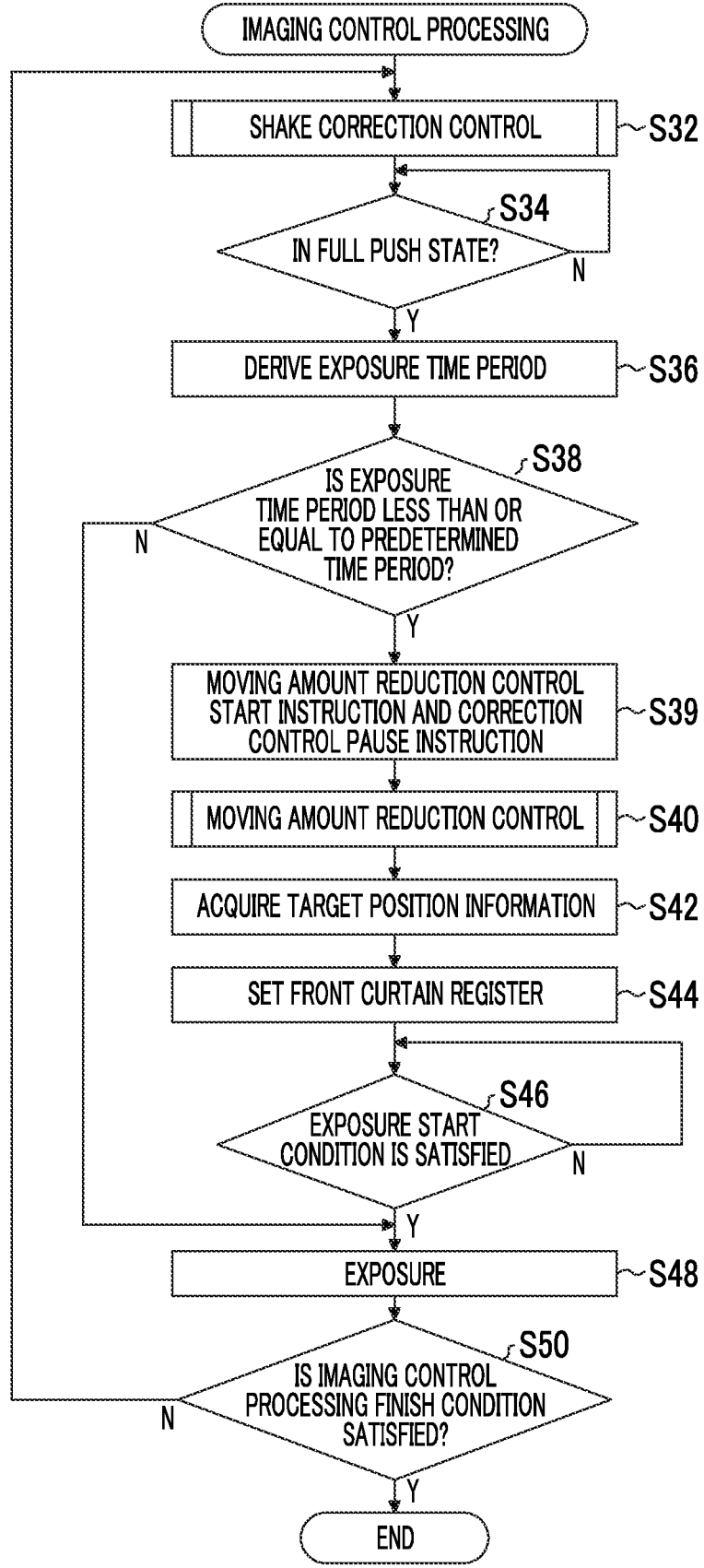
FIG. 8 is a flowchart of the imaging control processing of the imaging apparatus according to the first embodiment.

FIG. 8 is a flowchart illustrating an example of a flow of imaging control processing that is executed by the CPU 12 in accordance with the imaging control program 130 in a case where the imaging apparatus 100 is powered ON.

Figure 9:
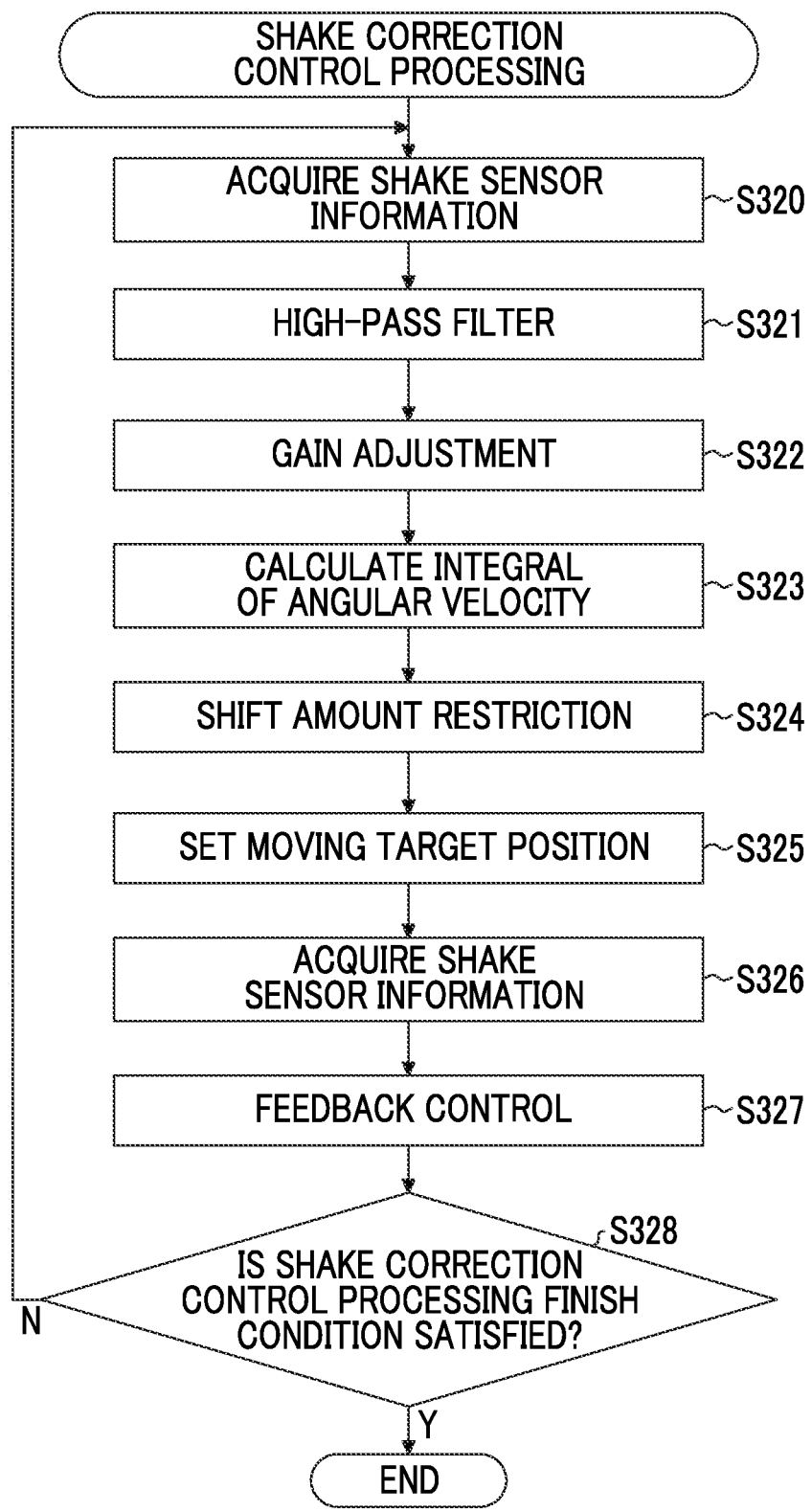
FIG. 9 is a flowchart of shake correction control processing of the imaging apparatus according to the first embodiment.

In the imaging control processing illustrated in FIG. 8 as an example, first, in step S32, the shake correction control unit 112 starts the shake correction control illustrated in FIG. 9 as an example. Then, the imaging control processing transitions to step S34.

In shake correction control processing illustrated in FIG. 9, first, in step S320, the shake correction control unit 112 acquires shake information from the shake sensor 30. Then, the shake correction control processing transitions to step S321. The shake sensor 30 is, for example, a gyro sensor, and the shake information is, for example, angular velocity information. Hereinafter, the shake information will be described as an angular velocity indicating the angular velocity information.

In step S321, the shake correction control unit 112 performs zero-point correction or the like on the acquired angular velocity and then, performs high-pass filter processing for removing a low-frequency component of the angular velocity on which the zero-point correction cannot be performed. Then, the shake correction control processing transitions to step S322.

In step S322, the shake correction control unit 112 performs gain adjustment on the angular velocity. Then, the shake correction control processing transitions to step S323.

In step S323, the shake correction control unit 112 converts the angular velocity into a position to which the imaging element 20 is to be moved in order to cancel the shake, by calculating an integral of the angular velocity. Then, the shake correction control processing transitions to step S324. An integral value of the angular velocity per calculation time period corresponds to a changed amount of the position.

In step S324, the shake correction control unit 112 performs shift amount restriction on the moving amount. Then, the shake correction control processing transitions to step S325. The shift amount restriction is processing of restricting movement of the imaging element 20 exceeding the movable range 22.

In step S325, based on the moving amount on which the shift amount restriction is performed, the shake correction control unit 112 derives the target position to which the imaging element 20 is moved, and sets the moving target position as the moving target position.

The moving target position set in step S325 is calculated and set each time the angular velocity from the shake sensor 30 is sampled. In addition, current position information acquired in step S326 is acquired each time information from the position sensor 31 is sampled, and is used in calculation for a feedback control. In this case, a period of moving target position calculation may be different from a period of feedback control calculation. In a case where the periods of the moving target position calculation and the feedback control are different, aliasing accompanied by resampling, that is, folding noise, may occur.

In the first embodiment, in a case of performing the shake correction control on the imaging element 20, the moving amount reduction control unit 116 performs processing of smoothing information indicating the target position of the imaging element 20 in order to suppress occurrence of the aliasing. Specifically, in a case of setting the target position in step S325, the moving amount reduction control unit 116 uses a low-pass filter 70. In a case where the period of the moving target position calculation is shorter than the period of the feedback control calculation, that is, in a case of downsampling, the low-pass filter 70 performs in the period of the moving target position calculation. In a case where the period of the moving target position calculation is greater than or equal to the period of the feedback control calculation, that is, in a case of upsampling, the low-pass filter 70 performs in the period of the feedback control calculation.

Figure 10:
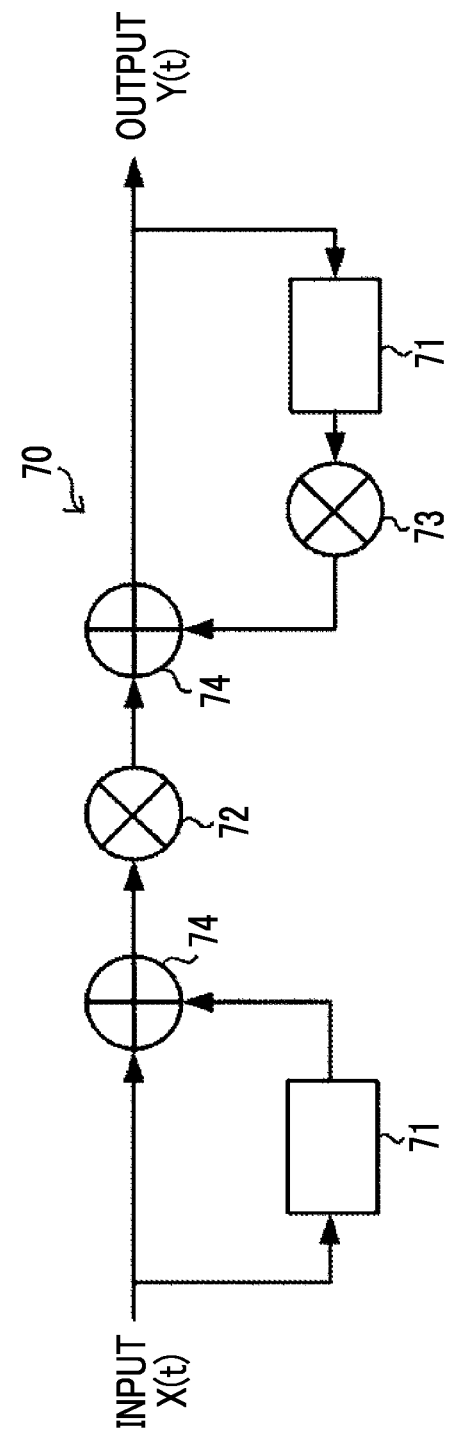
FIG. 10 is a circuit block diagram of a low-pass filter used for smoothing a target position in the first embodiment.

The CPU 12 includes the low-pass filter 70. As illustrated in FIG. 10 as an example, the low-pass filter 70 has functions as a delay circuit 71, a first filter circuit 72, a second filter circuit 73, and an adder 74. The low-pass filter 70 has a function of outputting an output Y(t) represented by an expression below with respect to an input X(t).

$$Y(t)=B \times Y(t-1)+A \times (X(t)+X(t-1))$$

Here, X(t) is the target position before smoothing at sampling time point t, and Y(t) is the target position after smoothing. A time point represented by (t−1) is a sampling time point immediately before t. In addition, A is a filter coefficient of the first filter circuit 72, and B is a filter coefficient of the second filter circuit 73. These may be variable values changeable in accordance with the instruction of the user, or may be fixed values.

For example, in a case where the period of the moving target position calculation is the same as the period of the feedback control calculation, the low-pass filter 70 does not need to be disposed.

In subsequent step S326, the shake correction control unit 112 acquires the current position information about the imaging element 20 from the position sensor 31. Then, the shake correction control processing transitions to step S327. The current position information is derived based on the information received from the position sensor 31.

In step S327, the shake correction control unit 112 performs the feedback control for moving the imaging element 20 to the moving target position based on the moving target position set in step S325 and the current position information acquired in step S326. For example, the feedback control is a PID control.

In subsequent step S328, the shake correction control unit 112 determines whether or not a shake correction control processing finish condition is satisfied. Here, for example, the "shake correction control processing finish condition" refers to a condition that power is OFF, or a condition that an instruction to finish the shake correction control processing is received from the exposure time period determination unit 118. In step S328, in a case where the shake correction control processing finish condition is satisfied, a positive determination is made, and the shake correction control unit 112 finishes the shake correction control processing. In step S328, in a case where the shake correction control processing finish condition is not satisfied, a negative determination is made, and the shake correction control processing transitions to step S320.

Returning to the imaging control processing in FIG. 8, in step S34, the exposure time period determination unit 118 determines whether or not the release button 211 is in the full push state. In step S34, in a case where the release button 211 is in the full push state, a positive determination is made, and the imaging control processing transitions to step S36. In step S34, in a case where the release button 211 is not in the full push state, a negative determination is made, and the determination in step S34 is performed again.

In step S36, the exposure time period determination unit 118 derives the exposure time period based on information from the light measurement sensor 29. Then, the imaging control processing transitions to step S38.

In step S38, the exposure time period determination unit 118 determines whether or not the derived exposure time period is less than or equal to the predetermined time period. In step S38, in a case where the exposure time period derived in step S36 is not less than or equal to the predetermined time period, a negative determination is made, and the imaging control processing transitions to step S48. In step S38, in a case where the exposure time period derived in step S36 is less than or equal to the predetermined time period, a positive determination is made, and the imaging control processing transitions to step S39.

In step S39, the exposure time period determination unit 118 outputs the instruction to start the moving amount reduction control to the moving amount reduction control unit 116. In addition, in step S39, the exposure time period determination unit 118 outputs the instruction to pause the shake correction control to the shake correction control unit 112. Then, the imaging control processing transitions to step S40.

Figure 11:
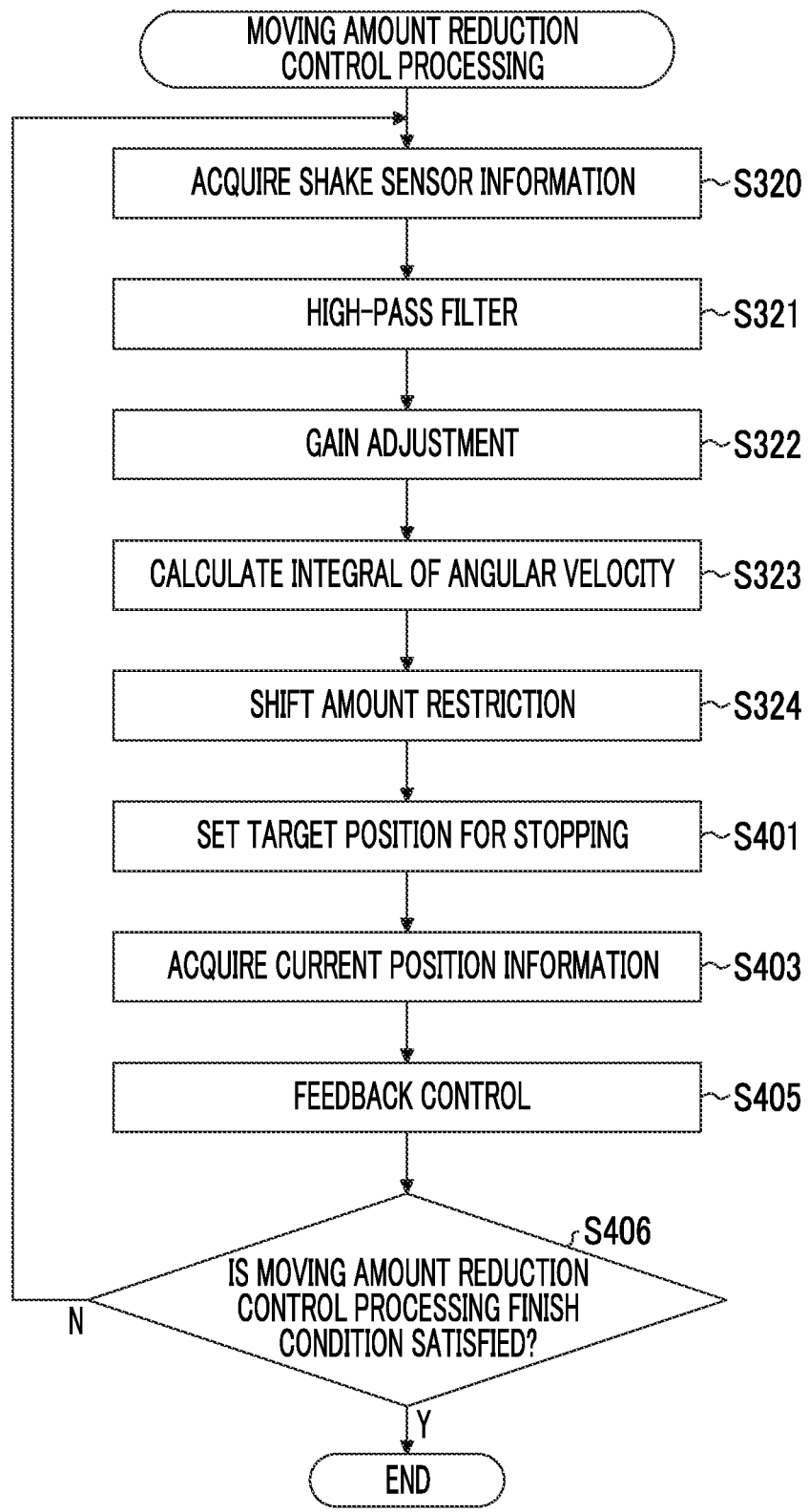
FIG. 11 is a flowchart of moving amount reduction control processing of the imaging apparatus according to the first embodiment.

In step S40, the moving amount reduction control unit 116 starts executing the moving amount reduction control processing illustrated in FIG. 11 as an example. Then, the imaging control processing transitions to step S42.

In the moving amount reduction control processing illustrated in FIG. 11, processing of step S320 to step S324 is the same as processing of step S320 to step S324 of the shake correction control processing illustrated in FIG. 9. Specifically, in step S320, the moving amount reduction control unit 116 acquires the angular velocity from the shake sensor 30. In step S321, the moving amount reduction control unit 116 performs the high-pass filter processing on the acquired angular velocity. In step S322, the moving amount reduction control unit 116 performs the gain adjustment on the angular velocity. In step S323, the moving amount reduction control unit 116 converts the angular velocity into the moving amount by calculating the integral of the angular velocity. In step S324, the moving amount reduction control unit 116 performs the shift amount restriction on the moving amount.

Next, in step S401, the moving amount reduction control unit 116 sets the target position to which the imaging element 20 is stopped. Specifically, the moving amount reduction control unit 116 acquires the specific timing position of the imaging element 20 based on the information from the shake sensor 30. The moving amount reduction control unit 116 sets the specific timing position as the target position for stopping the imaging element 20. Specifically, in step S322 illustrated in FIG. 11, a gain for processing the angular velocity from the shake sensor 30 is adjusted to zero. Accordingly, an input value for calculating the integral of the angular velocity becomes zero, and an output value (position) of calculation of the integral of the angular velocity becomes constant. Accordingly, the specific timing position is fixed as the target position for stopping the imaging element 20. Then, the moving amount reduction control processing transitions to step S403.

In step S403, the moving amount reduction control unit 116 acquires the current position information about the imaging element 20 based on the information from the position sensor 31. Then, the moving amount reduction control processing transitions to step S405.

In step S405, from the target position set in step S401 and the current position information acquired in step S403, the moving amount reduction control unit 116 performs the feedback control for stopping the imaging element 20 within the target range including the target position and then, transitions to step S406.

In step S406, the moving amount reduction control unit 116 determines whether or not a moving amount reduction control processing finish condition is satisfied. In step S406, in a case where the moving amount reduction control processing finish condition is satisfied, a positive determination is made, and the moving amount reduction control unit 116 finishes the moving amount reduction control processing. In step S406, in a case where the moving amount reduction control processing finish condition is not satisfied, a negative determination is made, and the moving amount reduction control processing transitions to step S320. Here, for example, the "moving amount reduction control processing finish condition" refers to a condition that exposure processing is started.

Returning to the imaging control processing illustrated in FIG. 8, in step S42, the exposure control unit 120 acquires the target position information about the imaging element 20 from the moving amount reduction control unit 116. Then, the imaging control processing transitions to step S44.

In step S44, the exposure control unit 120 sets the front curtain register based on the target position information in the direction V in the acquired target position information. Then, the imaging control processing transitions to step S46.

In step S46, the exposure control unit 120 determines whether or not an exposure start condition is satisfied. In step S46, in a case where the exposure start condition is satisfied, a positive determination is made, and the imaging control processing transitions to step S48. In a case where the exposure start condition is not satisfied, a negative determination is made, and the determination in step S46 is performed again in the imaging control processing.

Here, for example, the "exposure start condition" refers to a condition that the moving amount of the imaging element 20 is decreased to or below the predetermined value. In this case, in step S46, the exposure control unit 120 derives the moving amount from the target position of the imaging element 20 based on the information from the position sensor 31, and determines whether or not the moving amount of the imaging element 20 is decreased to or below the predetermined value. In step S46, in a case where the moving amount of the imaging element 20 is decreased to or below the predetermined value, a positive determination is made, and the imaging control processing transitions to step S48. In step S46, in a case where the moving amount of the imaging element 20 is not decreased to or below the predetermined value, a negative determination is made, and the determination in step S46 is performed again.

The "exposure start condition" is not limited to the above example. For example, the "exposure start condition" may be a condition that a predetermined time period elapses from the start of the moving amount reduction control.

In step S48, the exposure control unit 120 performs the exposure. Specifically, the exposure control unit 120 performs the reset control on the imaging element 20 at the timing of the resetting of the imaging element 20 set in step S44, and after the exposure time period elapses, starts traveling of the rear curtain 65. Then, the imaging control processing transitions to step S50.

In step S50, the moving amount reduction control unit 116 determines whether or not an imaging control processing finish condition is satisfied. In step S50, in a case where the imaging control processing finish condition is satisfied, a positive determination is made, and the moving amount reduction control unit 116 finishes the imaging control processing. In a case where the imaging control processing finish condition is not satisfied, a negative determination is made, and the imaging control processing returns to step S32. Here, for example, the "imaging control processing finish condition" refers to a condition that power is OFF.

The imaging apparatus 100 having the above configuration can reduce the moving amount for moving the imaging element from the elapse of the timing of reception of the instruction to start imaging until the start of the exposure of the imaging element, compared to the moving amount of the imaging element at the timing of reception of the instruction to start imaging. Thus, the uneven exposure value in the image obtained by imaging can be reduced, compared to a case of not reducing the moving amount of the imaging element.

In addition, by performing the stop control for stopping the imaging element 20 within the target range including the target position using the moving target position of the imaging element 20 at the predetermined first timing as the target position, the moving amount reduction control unit 116 can stop the imaging element 20 more quickly than in a case of performing the stop control using the initial position of the imaging element 20 as a target.

In addition, by deriving the timing of the resetting along the column direction of the imaging element 20 based on the target position of the imaging element 20 and performing the resetting along the column direction at the derived timing, the exposure control unit 120 can further reduce the uneven exposure value in the obtained image, compared to a case of not deriving the timing of the resetting along the column direction of the imaging element 20 based on the target position of the imaging element 20.

In addition, the exposure control unit 120 derives the timing of the resetting in accordance with the traveling speed characteristics of the rear curtain 65 and performs the resetting at the derived timing of the resetting. Accordingly, the uneven exposure value in the obtained image can be further reduced, compared to a case of not resetting the pixel lines 24 in accordance with the characteristics of the change in traveling speed of the rear curtain 65.

The moving amount reduction control unit 116 uses the low-pass filter 70. By using the low-pass filter 70, occurrence of the aliasing accompanied by resampling, that is, the folding noise, in a case where the calculation periods of the moving target position calculation for the imaging element 20 and the feedback control are different can be suppressed.

In addition, the exposure control unit 120 derives the moving amount from the target position of the imaging element 20 and starts the reset control in a case where the moving amount of the imaging element 20 is decreased to or below the predetermined value. Accordingly, the exposure can be started earlier than in a case of starting the reset control after the elapse of the predetermined time period from the moving amount reduction control.

Second Embodiment

Figure 12A:
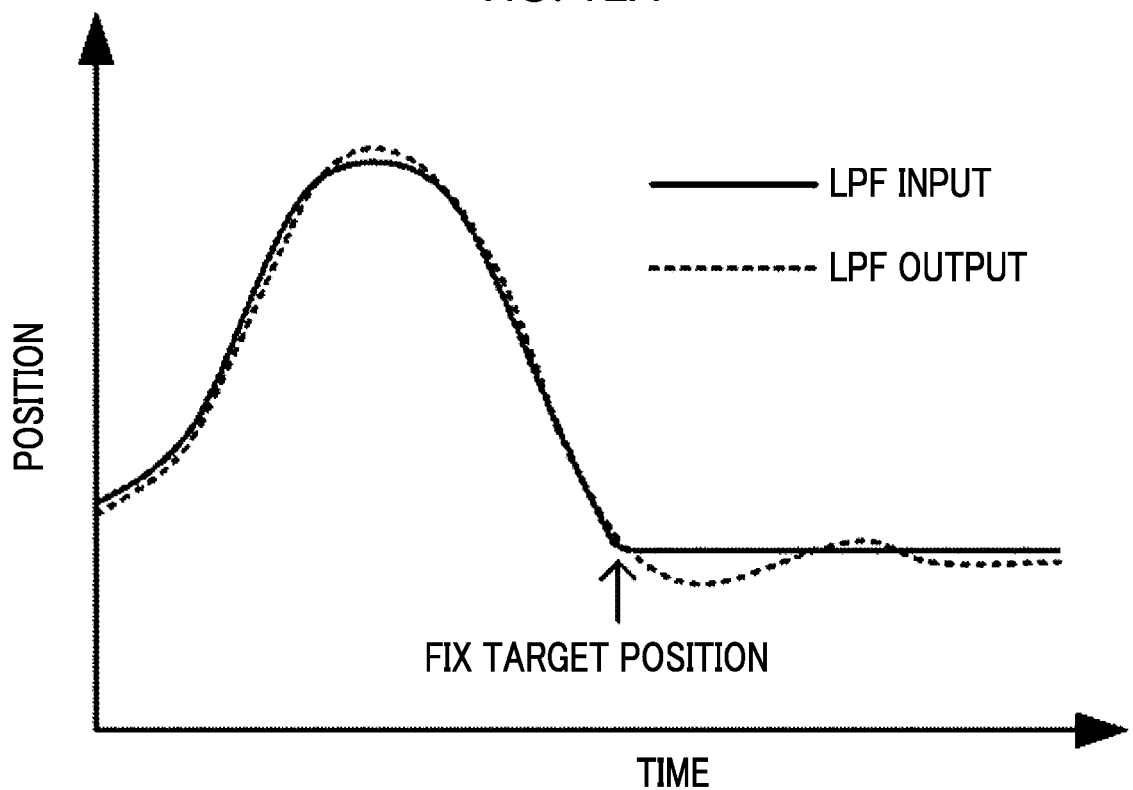
FIG. 12A is a schematic diagram illustrating an example of waveforms of an input and an output of the low-pass filter.

Next, a second embodiment will be described with reference to the drawings. In the first embodiment, the gain for processing the angular velocity from the shake sensor 30 is set to zero in order to fix the specific timing position as the target position for stopping the imaging element 20. Accordingly, the input value for calculating the integral of the angular velocity becomes zero, and the output value of calculation of the integral of the angular velocity becomes constant. The target position is fixed. In addition, the moving amount reduction control unit 116 uses the low-pass filter 70 for suppressing the folding noise. Consequently, information indicating the moving target position is smoothed. In such a case, in a case where the output value of calculation of the integral of the angular velocity is constant, as illustrated in FIG. 12A as an example, an output of the low-pass filter 70 changes due to a transient response as illustrated by dotted line in the drawing at a timing at which an input into the low-pass filter 70 becomes a constant value as illustrated by solid line in the drawing. In a case where the output of the low-pass filter 70 changes, it takes time for the moving amount of the imaging element 20 to decrease.

Figure 12B:
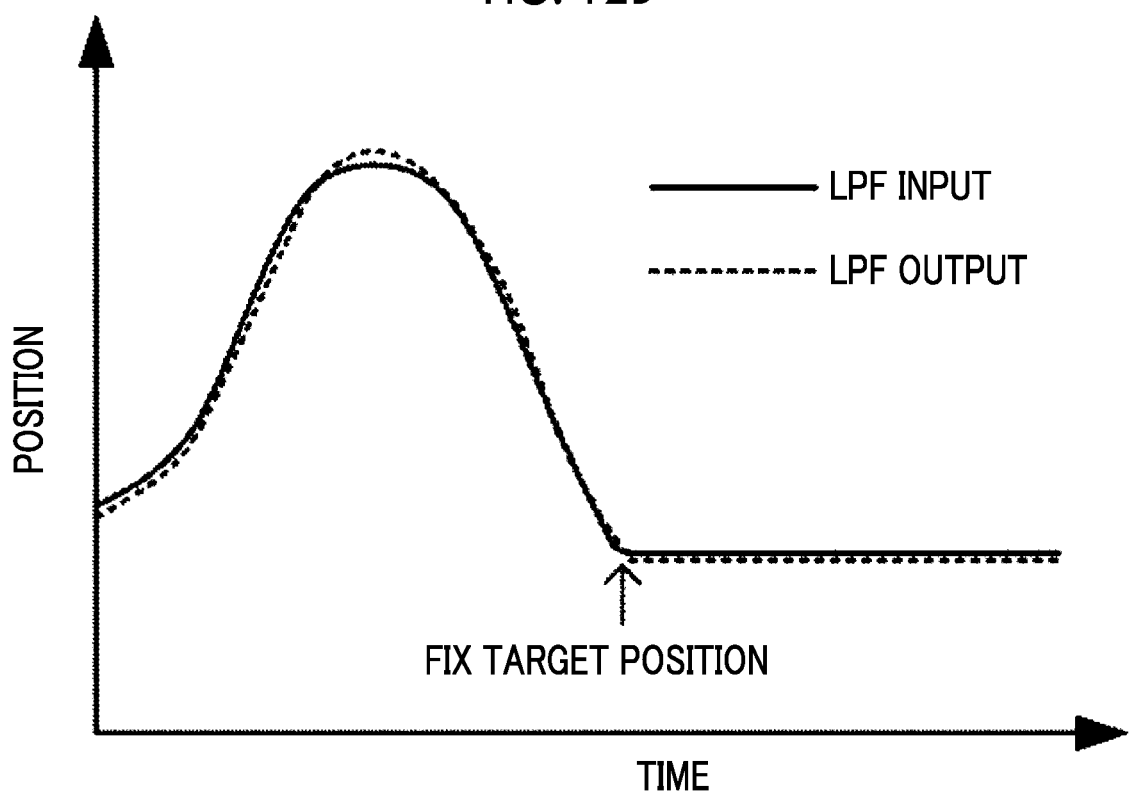
FIG. 12B is a schematic diagram illustrating an example of waveforms of an input and an output of a low-pass filter according to a second embodiment.

Therefore, in the second embodiment, in a case of performing the stop control on the imaging element 20, for example, at a timing of the start of the stop control, the moving amount reduction control unit 116 performs a control for fixing an output value obtained by smoothing the information indicating the target position of the imaging element 20 in the stop control. For example, as illustrated in FIG. 12B as an example, the moving amount reduction control unit 116 fixes an output value of the low-pass filter 70. Specifically, the moving amount reduction control unit 116 holds the output value from the low-pass filter 70 at the timing of the start of the moving amount reduction control and uses the held value as an input value of the feedback control as the target position of the imaging element 20. Accordingly, the output value obtained by smoothing the information indicating the target position of the imaging element 20 can be fixed. By using this method, the moving amount reduction control on the imaging element 20 can be prevented from being affected by a change in output of the low-pass filter 70.

Third Embodiment

Figure 13A:
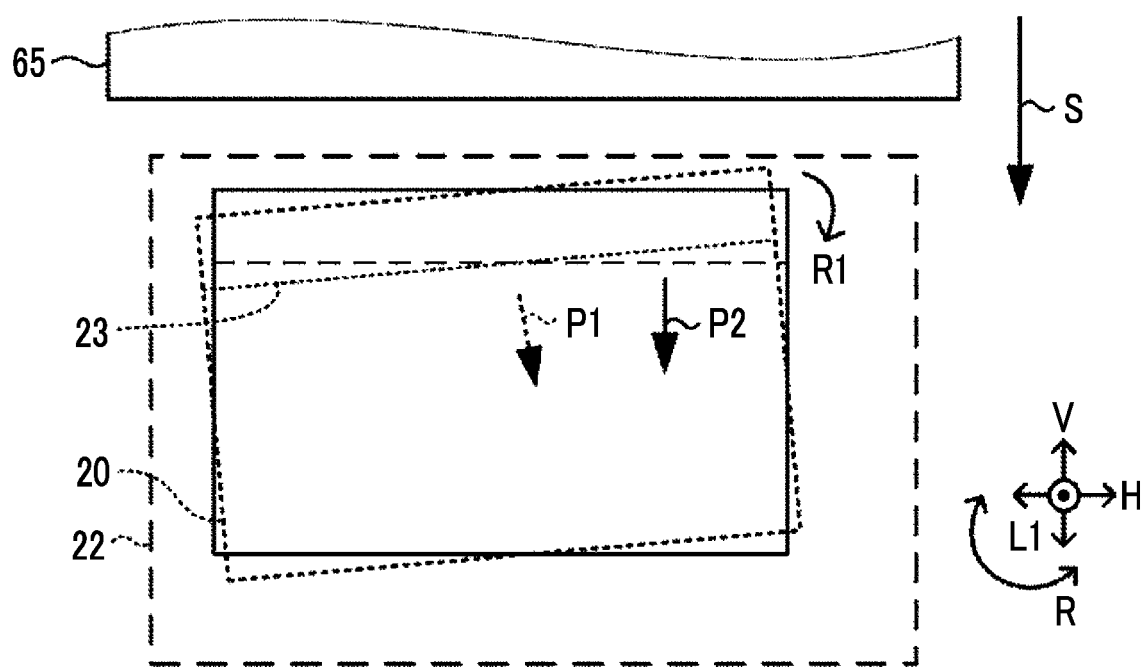
FIG. 13A is a schematic diagram of restoring a roll rotation amount of the imaging element to the initial position.

Next, a third embodiment will be described with reference to the drawings. The imaging element 20 is driven in the direction H, the direction V, and the rotation direction R for shake correction. Thus, in a case where the shake correction control is paused, and the moving amount reduction control is started, as illustrated in FIG. 13A as an example, the roll rotation amount about an optical axis of the imaging element 20 illustrated by dotted line may be different from the roll rotation amount at the initial position illustrated by solid line.

In a case where the exposure is performed in a state where the roll rotation amount about the optical axis of the imaging element 20 is different from the roll rotation amount at the initial position, a direction of the resetting of the imaging element 20 does not match the traveling direction of the rear curtain 65. Thus, a light amount incident on the light-receiving surface 21 of the imaging element 20 is different from a designed light amount, and the exposure value is not adjusted as designed. Therefore, in the third embodiment, the moving amount reduction control unit 116 performs a control for restoring the roll rotation amount of the imaging element 20 to the roll rotation amount at the initial position in the moving amount reduction control.

Figure 13B:
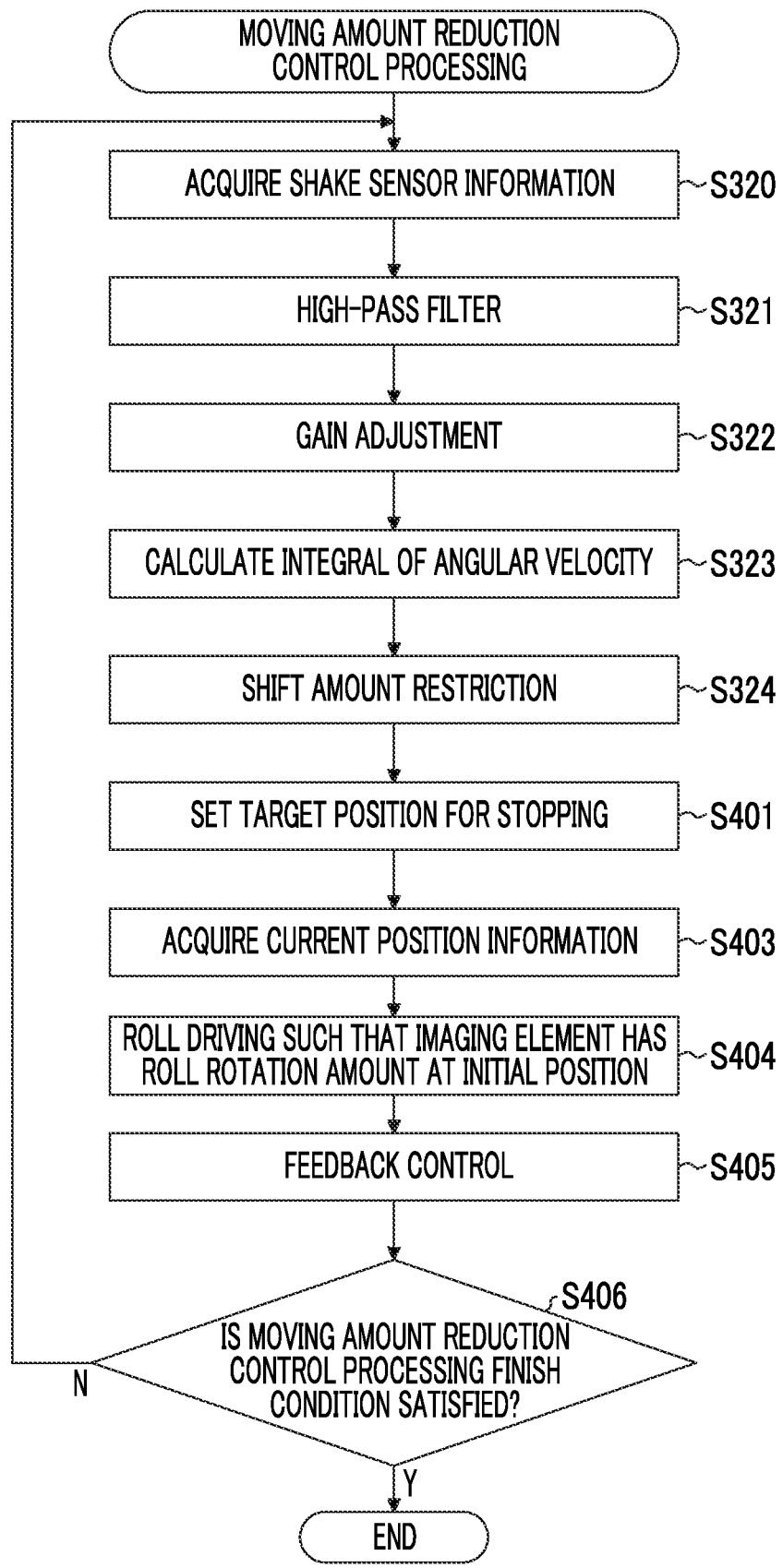
FIG. 13B is a flowchart of moving amount reduction control processing according to a third embodiment.

The moving amount reduction control processing according to the third embodiment will be described using FIG. 13B as an example. Step S320 to step S403 are the same steps as FIG. 11 and thus, will not be described. Next, in step S404, the moving amount reduction control unit 116 performs the control for restoring the roll rotation amount of the imaging element 20 to the initial position on the VCMs 52 at a predetermined timing. Then, the moving amount reduction control processing transitions to step S405.

Here, for example, the "predetermined timing" refers to a timing at which the moving amount reduction control unit 116 acquires the current position information about the imaging element 20. However, the predetermined timing is not limited thereto and may be the timing at which the moving amount reduction control unit 116 starts the moving amount reduction control, the timing at which the reception device 14 receives the instruction to start imaging from the user, or the like. Here, the "predetermined timing" is an example of a "predetermined second timing" according to the embodiments of the disclosed technology.

In step S405, the moving amount reduction control unit 116 performs the feedback control for stopping the imaging element 20 within the target range and then, transitions to step S406. Step S406 is the same as the step described using FIG. 11.

As illustrated in FIG. 13A, arrangement of the imaging element 20 before restoring the roll rotation amount to the initial position is arrangement illustrated by dotted line. In this case, the reset direction in a case of exposing the imaging element 20 is a direction illustrated by arrow P1. However, since the traveling direction of the rear curtain 65 is the direction of arrow S, the reset direction does not match the traveling direction of the rear curtain 65. However, the reset direction in a case where the roll rotation amount is restored to the same roll rotation amount as the initial position as illustrated by solid line by rotating the imaging element 20 in a direction of arrow R1 in the drawing is a direction of arrow P2 illustrated by solid line. That is, the reset direction and the traveling direction of the rear curtain 65 can be matched, and the uneven exposure value can be corrected as designed.

Fourth Embodiment

Next, a fourth embodiment will be described with reference to the drawings. The uneven exposure value in the acquired image occurs due to a change in position of the imaging element 20 in the column direction from the initial position. Movement of the imaging element 20 in the row direction is not a cause of the uneven exposure value. Therefore, in the fourth embodiment, after the timing of reception of the instruction to start imaging with less than or equal to the predetermined exposure time period, the shake correction control unit 112 performs, on the VCMs 52, a control for correcting the shake in the row direction by stopping movement of the imaging element 20 in the column direction at the initial position and moving the imaging element 20 in only the row direction.

Figure 14:
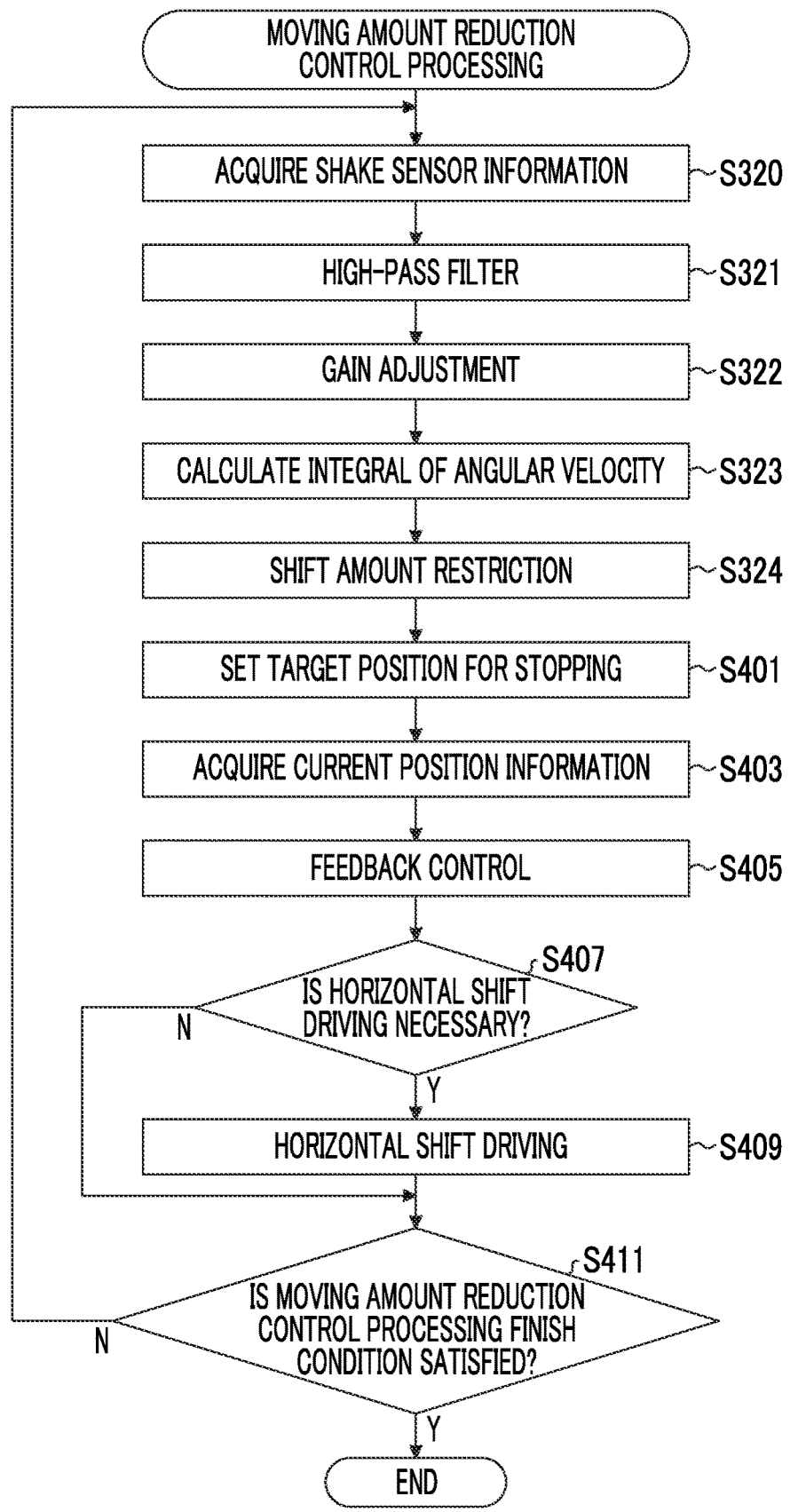
FIG. 14 is a flowchart of moving amount reduction control processing according to a fourth embodiment.

The moving amount reduction control according to the fourth embodiment will be described using FIG. 14 as an example. Step S320 to step S403 are the same steps as FIG. 11 and thus, will not be described. Next, in step S405, the moving amount reduction control unit 116 performs the feedback control for moving the imaging element 20 to the target position. Next, the moving amount reduction control transitions to step S407.

In step S407, the moving amount reduction control unit 116 determines whether or not horizontal shift driving is necessary. That is, a determination as to whether or not the shake in the direction H is detected is performed. More specifically, a determination as to whether or not a component in the direction H is detected from the output signal of the shake sensor 30 is performed.

In step S407, in a case where the horizontal shift driving is not necessary, a negative determination is made, and the moving amount reduction control processing transitions to step S411. In step S407, in a case where the horizontal shift driving is necessary, a positive determination is made, and the moving amount reduction control processing transitions to step S409.

In step S409, the moving amount reduction control unit 116 performs the horizontal shift driving on the imaging element 20. Then, the moving amount reduction control processing transitions to step S411.

In step S411, the moving amount reduction control unit 116 determines whether or not the moving amount reduction control processing finish condition is satisfied. In step S411, in a case where the moving amount reduction control processing finish condition is satisfied, a positive determination is made, and the moving amount reduction control unit 116 finishes the moving amount reduction control processing. In step S411, in a case where the moving amount reduction control processing finish condition is not satisfied, a negative determination is made, and the moving amount reduction control processing transitions to step S320. Here, for example, the "moving amount reduction control processing finish condition" refers to a condition that exposure processing is started.

As described above, by moving the imaging element 20 in the row direction for the shake correction, the shake in the row direction can be corrected, compared to a case of not moving the imaging element 20 in the row direction.

Fifth Embodiment

Next, a fifth embodiment will be described with reference to the drawings. The user can set a special imaging mode such as a continuous shooting mode and a bracket imaging mode as the imaging mode for a still picture. For example, the continuous shooting mode is a mode in which images of a plurality of frames are automatically and continuously captured during a full push on a shutter button. The bracket imaging mode is a mode in which images of a plurality of frames are captured with a plurality of predetermined different exposure values. In the fifth embodiment, the moving amount reduction control unit 116 performs a control for stopping the imaging element 20 within the target range during such a special imaging mode, that is, while imaging for still images of a plurality of frames is performed in accordance with the instruction to start imaging issued once.

Figure 15:
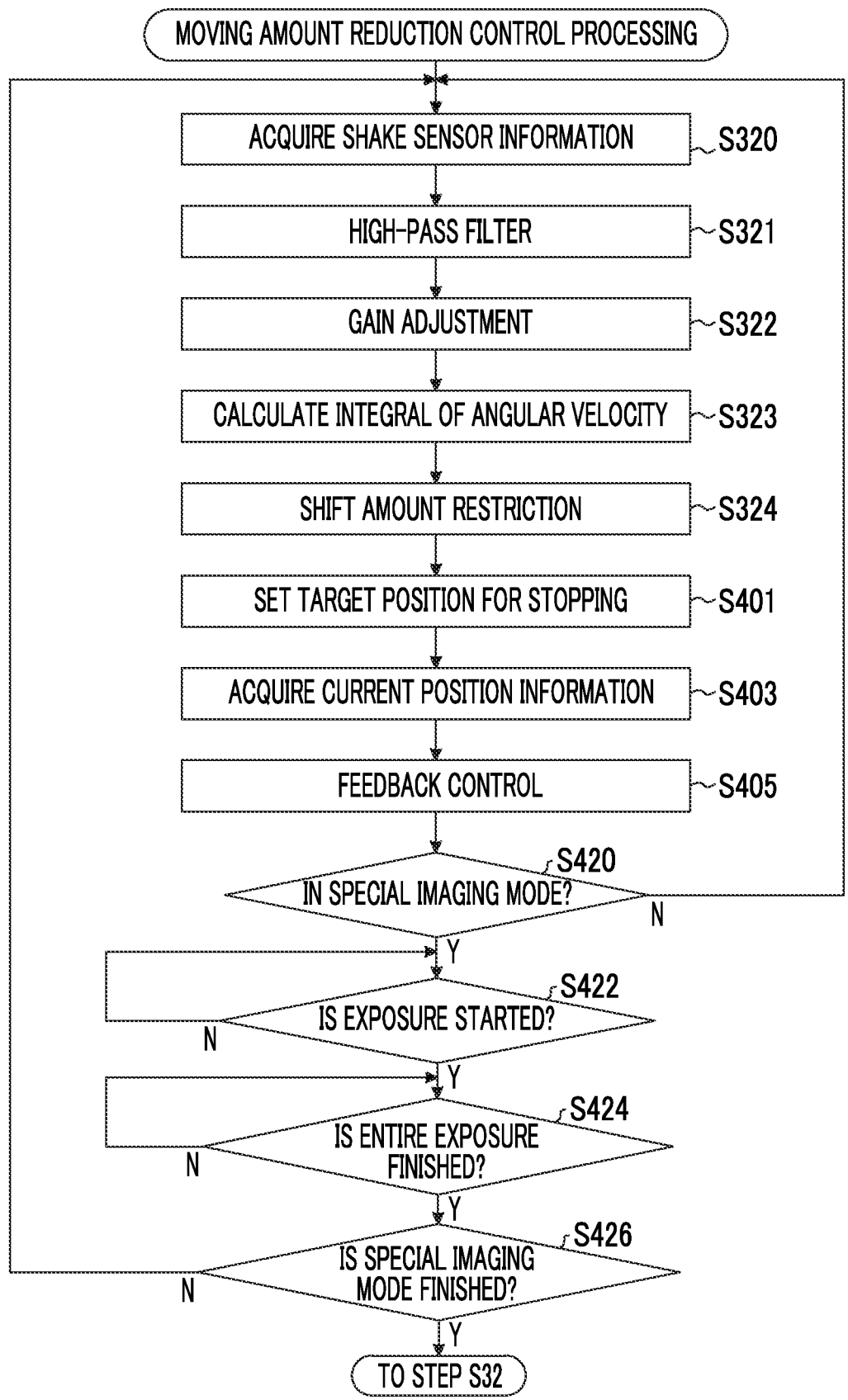
FIG. 15 is a flowchart of moving amount reduction control processing according to a fifth embodiment.

The moving amount reduction control processing according to the fifth embodiment will be described using FIG. 15 as an example. Step S320 to step S405 are the same steps as FIG. 11 and thus, will not be described.

In step S420, the moving amount reduction control unit 116 determines whether or not the current imaging mode is the special imaging mode. In step S420, in a case where the current imaging mode is not the special imaging mode, a negative determination is made, and the moving amount reduction control processing transitions to step S320. In step S420, in a case where the current imaging mode is the special imaging mode, a positive determination is made, and the moving amount reduction control processing transitions to step S422.

In step S422, the moving amount reduction control unit 116 determines whether or not the exposure is started. In step S422, in a case where the exposure is not started, a negative determination is made, and the determination in step S422 is performed again. In step S422, in a case where the exposure is started, a positive determination is made, and the moving amount reduction control processing transitions to step S424.

In step S424, the exposure control unit 120 determines whether or not the entire exposure is finished. In step S424, in a case where the entire exposure is not finished, a negative determination is made, and the determination in step S424 is performed again. In step S424, in a case where the entire exposure is finished, a positive determination is made, and the moving amount reduction control processing transitions to step S426.

In step S426, the moving amount reduction control unit 116 determines whether or not the special imaging mode is finished. In step S426, in a case where the special imaging mode is finished, a positive determination is made. The moving amount reduction control unit 116 finishes the moving amount reduction control processing and transitions to step S32 illustrated in FIG. 8. In step S426, in a case where the special imaging mode is not finished, a negative determination is made, and the moving amount reduction control processing returns to step S320. Here, for example, the "finish of the special imaging mode" refers to a case where the user unsets the special imaging mode.

In the imaging for the still images of the plurality of frames, in a case where the shake is corrected for each frame, and the imaging element is stopped at each correction and resumed, it takes time for the moving amount of the imaging element 20 to decrease to or below a predetermined moving amount. Meanwhile, by stopping the imaging element within the target range until the imaging of the plurality of frames is finished, a time interval of the imaging of the plurality of frames can be decreased.

Sixth Embodiment

As described in each embodiment, in a case where the exposure time period is less than or equal to the predetermined time period, the uneven exposure value in the obtained image can be suppressed by stopping the imaging element 20. However, even in a case where such a control is performed, the uneven exposure value may remain in the image. In order to deal with such a case, the image processing unit 28 may further perform the shading correction in the column direction on the image obtained by imaging.

Figure 16:
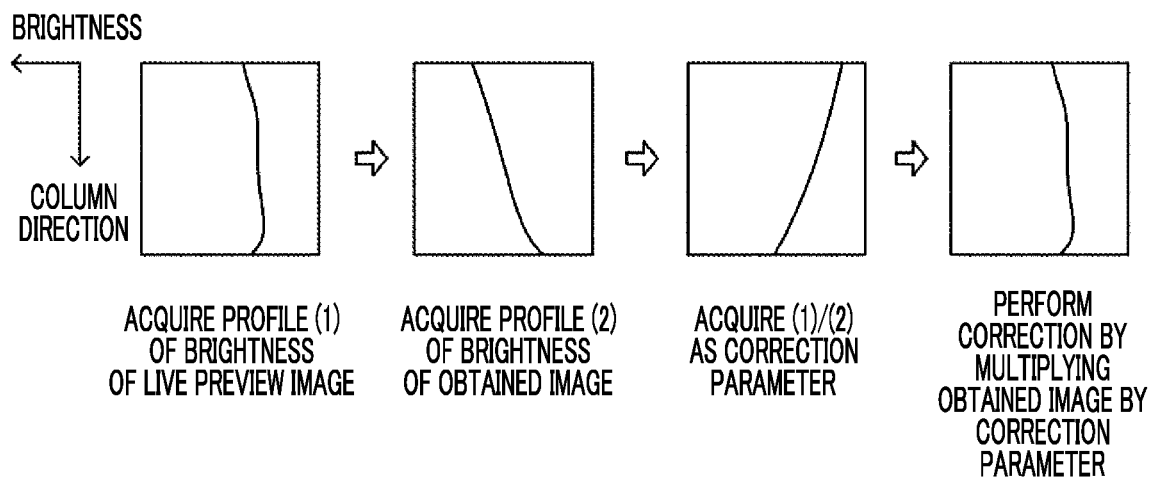
FIG. 16 is a diagram illustrating a method of performing shading correction on an image according to a sixth embodiment.

Specifically, as illustrated in FIG. 16, the image processing unit 28 extracts a still image close to the time of imaging from the live preview image and acquires profile (1) of brightness in the column direction. Similarly, the image processing unit 28 acquires profile (2) of the brightness, in the column direction, of the image obtained using the above imaging method. Next, the image processing unit 28 acquires a correction parameter obtained by dividing profile (1) by profile (2). Next, the image processing unit 28 acquires an image in which the brightness is corrected by multiplying the image obtained using the above imaging method by the correction parameter.

By performing the shading correction as described above, even in a case where the uneven exposure value occurs in the image obtained using a method of adjusting the timing of the resetting of the front curtain, the uneven exposure value can be suppressed, compared to a case where the shading correction is not performed.

While the imaging apparatus according to each embodiment is the digital camera, the disclosed technology is not limited thereto and can be applied to, for example, an imaging apparatus such as a digital video camera, or an imaging module mounted in an electronic endoscope, a mobile phone with a camera, and the like.

Each processing of the imaging control processing, the shake correction control processing, the moving amount reduction control processing, and the exposure control processing according to the embodiments of the disclosed technology is merely an example. Accordingly, unnecessary steps may be deleted, new steps may be added, or a processing order may be rearranged without departing from a gist of the disclosed technology.

In the above description, while an example of a form of executing various types of processing according to the embodiments of the disclosed technology by the CPU 12 is illustrated, the disclosed technology is not limited thereto. Various programs according to the embodiments of the disclosed technology may be executed by a CPU other than the CPU 12.

Figure 17:
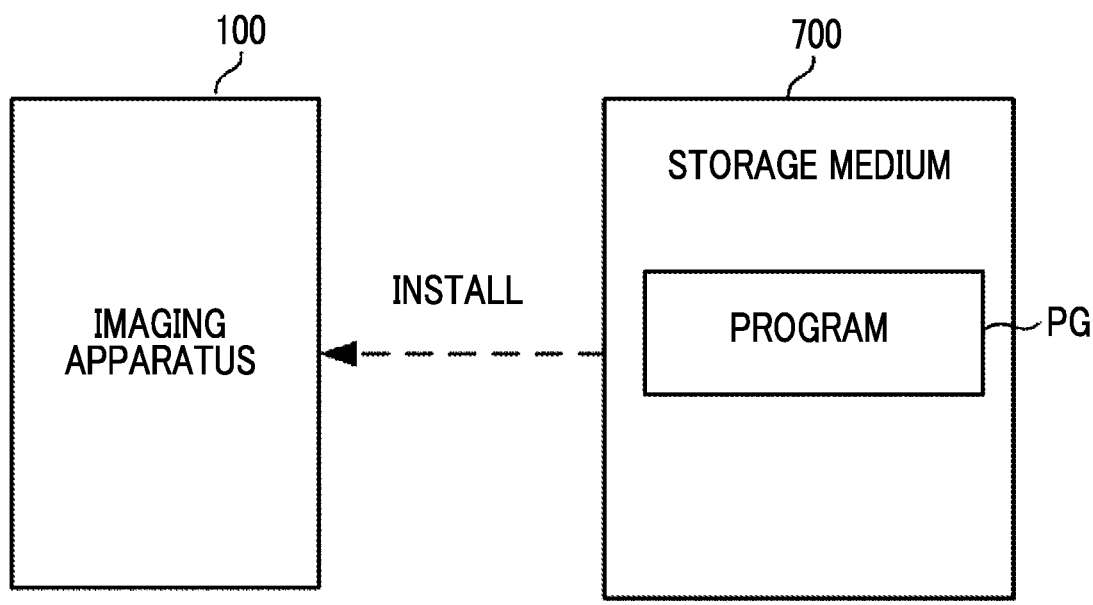
FIG. 17 is a conceptual diagram of installing a program on the imaging apparatus from a storage medium.

Here, the "various programs according to the embodiments of the disclosed technology" refer to the imaging control program and the like. These programs will be referred to as a "program PG". For example, as illustrated in FIG. 17, the program PG may be stored in any portable storage medium 700 such as an SSD, a USB memory, or a DVD-ROM. The storage medium 700 is a non-temporary storage medium. In this case, the program PG of the storage medium 700 is installed on the imaging apparatus 100, and the installed program PG is executed by the CPU 12.

Alternatively, the program PG may be stored in a storage unit of another computer, a server apparatus, or the like connected to the imaging apparatus 100 through a communication network (not illustrated), and the program PG may be downloaded in accordance with a request from the imaging apparatus 100. In this case, the downloaded program PG is executed by the CPU 12 of the imaging apparatus 100.

In the above embodiments, for example, various processors illustrated below can be used as a hardware resource for executing various types of processing according to the embodiments of the disclosed technology. Example of the processors includes a CPU that is a general-purpose processor functioning as the hardware resource for executing the various types of processing according to the embodiments of the disclosed technology by executing software, that is, the program, as described above. In addition, example of the processors includes a dedicated electric circuit such as an FPGA, a PLD, or an ASIC that is a processor having a circuit configuration dedicatedly designed to execute a specific type of processing.

The hardware resource for executing the various types of processing according to the embodiments of the disclosed technology may be configured with one of those various processors or may be configured with a combination of two or more processors of the same type or different types (for example, a combination of a plurality of FPGAs or a combination of a CPU and an FPGA). In addition, the hardware resource for executing various types of processing according to the embodiments of the disclosed technology may be one processor.

Example of the configuration with one processor includes, first, as represented by a computer such as a client and a server, a form in which one processor is configured with a combination of one or more CPUs and software, and in which this processor functions as the hardware resource for executing the various types of processing according to the embodiments of the disclosed technology. Second, as represented by an SoC or the like, a form of using a processor that implements, by one IC chip, a function of the entire system including a plurality of hardware resources for executing the various types of processing according to the embodiments of the disclosed technology is included. In such a manner, the various types of processing according to the embodiments of the disclosed technology are implemented using one or more of the various processors as the hardware resource.

Furthermore, as a hardware structure of those various processors, more specifically, an electric circuit in which circuit elements such as semiconductor elements are combined can be used.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, technical standards are specifically and individually indicated to be incorporated by reference.

What is claimed is:

1. An imaging apparatus comprising:
an imaging element in which a plurality of pixels are arranged in a row direction and a column direction;
a moving mechanism that corrects a shake by moving the imaging element;
a curtain that blocks an incidence ray on the imaging element by traveling in the column direction; and
a processor configured to,
in a state where the moving mechanism moves the imaging element, in a case where an instruction to start imaging with an exposure time period less than or equal to a predetermined time period is received, perform a moving amount reduction control for reducing a moving amount for moving the imaging element from an elapse of a timing of reception of the instruction until a start of exposure of the imaging element, compared to a moving amount of the imaging element at the timing of reception of the instruction,
in a state where the moving amount reduction control is performed, start a reset control for sequentially resetting the plurality of pixels included in the imaging element along the column direction for each line in the row direction, and
after an elapse of a time period corresponding to the exposure time period from the start of the reset control, cause the curtain to travel in the column direction,
wherein the moving amount reduction control is a stop control for stopping the imaging element within a target range including a target position using a moving target position of the imaging element at a predetermined first timing as the target position,
the processor is configured to derive a timing of the resetting along the column direction based on the target position of the imaging element and reduce an uneven exposure value in an image obtained by imaging by the imaging element due to performing the resetting along the column direction at the derived timing,
the processor is configured to start the reset control in a case where the moving amount of the imaging element is decreased to or below a predetermined value, and the processor is configured to, after the timing of reception of the instruction, perform a control for correcting the shake in the row direction by moving the imaging element, on the moving mechanism in only the row direction at an initial position of the imaging element.

2. The imaging apparatus according to claim 1,
wherein the processor is configured to derive the timing of the resetting in accordance with traveling speed characteristics of the curtain.

3. The imaging apparatus according to claim 1,
wherein the stop control is a control for stopping the imaging element within the target range while imaging for still images of a plurality of frames is performed in accordance with the instruction issued once.

4. The imaging apparatus according to claim 1,
wherein the processor is configured to, in a case of performing the stop control on the imaging element, perform processing of smoothing information indicating the target position of the imaging element in the stop control.

5. The imaging apparatus according to claim 4,
wherein the processor is configured to, in a case of performing the stop control on the imaging element, perform a control for fixing an output value obtained by smoothing the information indicating the target position of the imaging element in the stop control, at a timing of a start of the stop control.

6. The imaging apparatus according to claim 1,
wherein the processor is configured to start the reset control in a case where the moving amount of the imaging element is decreased to or below a predetermined value.

7. The imaging apparatus according to claim 1,
wherein the processor is configured to perform a control for restoring a roll rotation amount of the imaging element to an initial position, on the moving mechanism at a predetermined second timing.

8. The imaging apparatus according to claim 1,
wherein the processor is configured to further perform shading correction in the column direction on an image obtained by imaging.

9. The imaging apparatus according to claim 2,
wherein the stop control is a control for stopping the imaging element within the target range while imaging for still images of a plurality of frames is performed in accordance with the instruction issued once.

10. The imaging apparatus according to claim 2,
wherein the processor is configured to, in a case of performing the stop control on the imaging element, perform processing of smoothing information indicating the target position of the imaging element in the stop control.

11. The imaging apparatus according to claim 3,
wherein the processor is configured to, in a case of performing the stop control on the imaging element, perform processing of smoothing information indicating the target position of the imaging element in the stop control.

12. The imaging apparatus according to claim 2,
wherein the processor is configured to start the reset control in a case where the moving amount of the imaging element is decreased to or below a predetermined value.

13. The imaging apparatus according to claim 3,
wherein the processor is configured to start the reset control in a case where the moving amount of the imaging element is decreased to or below a predetermined value.

14. The imaging apparatus according to claim 4,
wherein the processor is configured to start the reset control in a case where the moving amount of the imaging element is decreased to or below a predetermined value.

15. The imaging apparatus according to claim 5,
wherein the processor is configured to start the reset control in a case where the moving amount of the imaging element is decreased to or below a predetermined value.

16. The imaging apparatus according to claim 2,
wherein the processor is configured to perform a control for restoring a roll rotation amount of the imaging element to an initial position, on the moving mechanism at a predetermined second timing.

17. An imaging method comprising:
a step of, in a case where an instruction to start imaging with an exposure time period less than or equal to a predetermined time period is received during shake correction of correcting a shake by moving an imaging element in which a plurality of pixels are arranged in a row direction and a column direction, reducing a moving amount for moving the imaging element from an elapse of a timing of reception of the instruction until a start of exposure of the imaging element, compared to a moving amount of the imaging element at the timing of reception of the instruction;
a step of, in a state where the step of reducing the moving amount is performed, starting a reset control for sequentially resetting the plurality of pixels included in the imaging element along the column direction for each line in the row direction;
a step of causing a curtain blocking an incidence ray on the imaging element to travel after an elapse of a time period corresponding to the exposure time period from the start of the reset control;
a step of stopping the imaging element within a target range including a target position using a moving target position of the imaging element at a predetermined first timing as the target position;
a step of deriving a timing of the resetting along the column direction based on the target position of the imaging element; and
a step of reducing an uneven exposure value in an image obtained by imaging by the imaging element due to performing the resetting along the column direction at the derived timing,
wherein the method further comprises:
a step of starting the reset control in a case where the moving amount of the imaging element is decreased to or below a predetermined value, and
after the timing of reception of the instruction, a step of performing a control for correcting the shake in the row direction by moving the imaging element, in only the row direction at an initial position of the imaging element.

18. A non-transitory computer-readable storage medium storing an imaging program for causing a computer to execute:
a procedure of, in a case where an instruction to start imaging with an exposure time period less than or equal to a predetermined time period is received during shake correction of correcting a shake by moving an imaging element in which a plurality of pixels are arranged in a row direction and a column direction, reducing a moving amount for moving the imaging element from an elapse of a timing of reception of the instruction until a start of exposure of the imaging element, compared to a moving amount of the imaging element at the timing of reception of the instruction;

a procedure of, in a state where the procedure of reducing the moving amount is performed, starting a reset control for sequentially resetting the plurality of pixels included in the imaging element along the column direction for each line in the row direction;

a procedure of causing a curtain blocking an incidence ray on the imaging element to travel after an elapse of a time period corresponding to the exposure time period from the start of the reset control;

a procedure of stopping the imaging element within a target range including a target position using a moving target position of the imaging element at a predetermined first timing as the target position;

a procedure of deriving a timing of the resetting along the column direction based on the target position of the imaging element; and a procedure of reducing an uneven exposure value in an image obtained by imaging by the imaging element due to performing the resetting along the column direction at the derived timing, wherein the imaging program further causes the computer to execute:

a procedure of starting the reset control in a case where the moving amount of the imaging element is decreased to or below a predetermined value, and after the timing of reception of the instruction, a procedure of performing a control for correcting the shake in the row direction by moving the imaging element, in only the row direction at an initial position of the imaging element.

* * * * *